US012617209B2

(12) United States Patent
Sawadaishi

(10) Patent No.: US 12,617,209 B2
(45) Date of Patent: May 5, 2026

(54) LIQUID EJECTION APPARATUS

(71) Applicant: SEIKO EPSON CORPORATION, Tokyo (JP)

(72) Inventor: Makoto Sawadaishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 276 days.

(21) Appl. No.: 18/609,197

(22) Filed: Mar. 19, 2024

(65) Prior Publication Data

US 2024/0316936 A1 Sep. 26, 2024

(30) Foreign Application Priority Data

Mar. 20, 2023 (JP) ................................ 2023-043902

(51) Int. Cl.
*B41J 2/165* (2006.01)
*B41J 2/175* (2006.01)

(52) U.S. Cl.
CPC ....... *B41J 2/16547* (2013.01); *B41J 2/16585* (2013.01); *B41J 2/17596* (2013.01); *B41J 2002/16582* (2013.01); *B41J 2002/16594* (2013.01); *B41P 2235/20* (2013.01); *B41P 2251/10* (2013.01)

(58) Field of Classification Search
CPC ......................... B41J 2/16547; B41J 2/16585; B41J 2/17596; B41J 2002/16582; B41J 2002/16594
See application file for complete search history.

(56) References Cited

U.S. PATENT DOCUMENTS 8,540,341 B2 * 9/2013 Yamamoto ........... B41J 2/16523 347/85
10,525,720 B2 * 1/2020 Udagawa ............... B41J 2/1714
2020/0070517 A1 * 3/2020 Sato .......................... B41J 2/175
2022/0097381 A1 * 3/2022 Shimomura ......... B41J 2/16538
2022/0203694 A1 * 6/2022 Koase .................. B41J 2/17596

FOREIGN PATENT DOCUMENTS

JP 2020-006583 A 1/2020

* cited by examiner

*Primary Examiner* — Sharon Polk
(74) *Attorney, Agent, or Firm* — OLIFF PLC

(57) ABSTRACT

A liquid ejection apparatus includes a wiper carriage 59, and a pressurizing mechanism 60 disposed in a liquid supply path 73 via which a liquid from the liquid storage portion 101 is supplied to an ejection head 20H. The wiper carriage 59 has a wiper 58, which is an example of a maintenance portion. The pressurizing mechanism 60 includes a liquid storage chamber 63 that forms a portion of the liquid supply path 73 and a diaphragm 62, which is an example of a deforming member configured to be deformed to change the volume of the liquid storage chamber 63. The wiper carriage 59 causes the liquid in a nozzle 20N of the ejection head 20H communicating with the liquid storage chamber 63 to flow in a discharge direction by pressing the diaphragm 62 at the pressurized position to pressurize the liquid storage chamber 63.

11 Claims, 12 Drawing Sheets

LIQUID EJECTION APPARATUS

The present application is based on, and claims priority from JP Application Serial Number 2023-043902, filed Mar. 20, 2023, the disclosure of which is hereby incorporated by reference herein in its entirety.

BACKGROUND

1. Technical Field

The present disclosure relates to a liquid ejection apparatus that includes an ejection head that ejects a liquid and a maintenance portion that maintains the ejection head.

2. Related Art

For example, JP-A-2020-6583 discloses, as an example of a liquid ejection apparatus, an ink jet print apparatus that includes a print portion, such as an ejection head, and performs printing on a medium to be transported, such as paper. This type of print apparatus has a maintenance portion that maintains the ejection head. The maintenance portion performs maintenance while facing the ejection head. Accordingly, at least one of the ejection head and the maintenance portion needs to move to a position at which both of them face each other.

For example, a line head type print apparatus has a structure in which a cap unit including a cap and a wiper as an example of the maintenance portion moves. The cap unit integrally includes a cap that covers the ink ejection surface of a print portion and a wiper that wipes ink from the nozzle surface. In addition, print apparatuses as described above may include, as individual units, a cap unit having a cap, which is an example of a component in the maintenance portion, and a wiper unit having a wiper, which is another example of a component in the maintenance portion.

In addition, the print apparatus performs cleaning that forcibly discharges the liquid from the nozzles of the ejection head. The cleaning includes pressurized cleaning and suction cleaning. Pressurized cleaning forcibly discharges the liquid from the nozzles by pressurizing the liquid supply source, such as an ink pack or the like, disposed upstream of the ejection head. On the other hand, suction cleaning forcibly discharges the liquid from the nozzles by the suction pump generating negative pressure in an enclosed space formed between the cap and the ejection head so as to communicate with the nozzles with the ejection head capped by the cap.

The liquid ejection apparatus described in JP-A-2020-6583 uses pressurized cleaning. The liquid ejection apparatus includes a pressurizing mechanism. The pressurizing mechanism has two chambers defined by a flexible member. One of the chambers is an air chamber, and the other is a liquid chamber, which is an example of the liquid storage chamber. A spring that biases the flexible member toward the liquid storage chamber is disposed in the air chamber. In addition, the air chamber is coupled to the pressure pump, and the pressure of the air chamber is reduced by the pressure pump being driven. When the pressure of the air chamber is reduced, the flexible member deforms against the biasing force of the spring so as to increase the volume of the liquid storage chamber. This causes the liquid to be stored in the liquid storage chamber. When the reduced pressure of the air chamber is released in this state, the biasing force of the spring causes the flexible member to push out the liquid in the liquid storage chamber. Pressurized cleaning is performed by the pushed out liquid being discharged from the nozzles of the ejection head.

However, when the flexible member is pressurized by a spring after a pressure pump causes a liquid, such as ink or the like, to be stored, sealed spaces need to be formed by the surfaces of the flexible member on the liquid storage chamber side and on the air chamber side. Accordingly, since the process of ensuring the hermeticity of these two chambers, the process of checking the hermeticity, and the like are necessary in the manufacturing process, process management becomes complex. In addition, since components, such as a pressure sensor for pressure management via a pressure pump, are necessary for moving the flexible member, the product cost increases. Accordingly, there is a demand for a liquid ejection apparatus in which the pressurizing mechanism and the drive system that drives the pressurizing mechanism each have a simplified structure.

SUMMARY

A liquid ejection apparatus for solving the problem described above includes: a carriage having a maintenance portion that maintains an ejection head ejecting a liquid from a nozzle; and a pressurizing mechanism disposed in a liquid supply path via which a liquid from the liquid storage portion is supplied to an ejection head, in which the pressurizing mechanism includes a liquid storage chamber that forms a portion of the liquid supply path and a deforming member configured to be deformed to change a volume of the liquid storage chamber, the carriage is configured to press the deforming member at a pressurized position on a movement route, and the carriage causes a liquid in the nozzle of the ejection head communicating with the liquid storage chamber to flow in a discharge direction by pressing the deforming member at the pressurized position to pressurize the liquid storage chamber.

DESCRIPTION OF EMBODIMENTS

Figure 1:
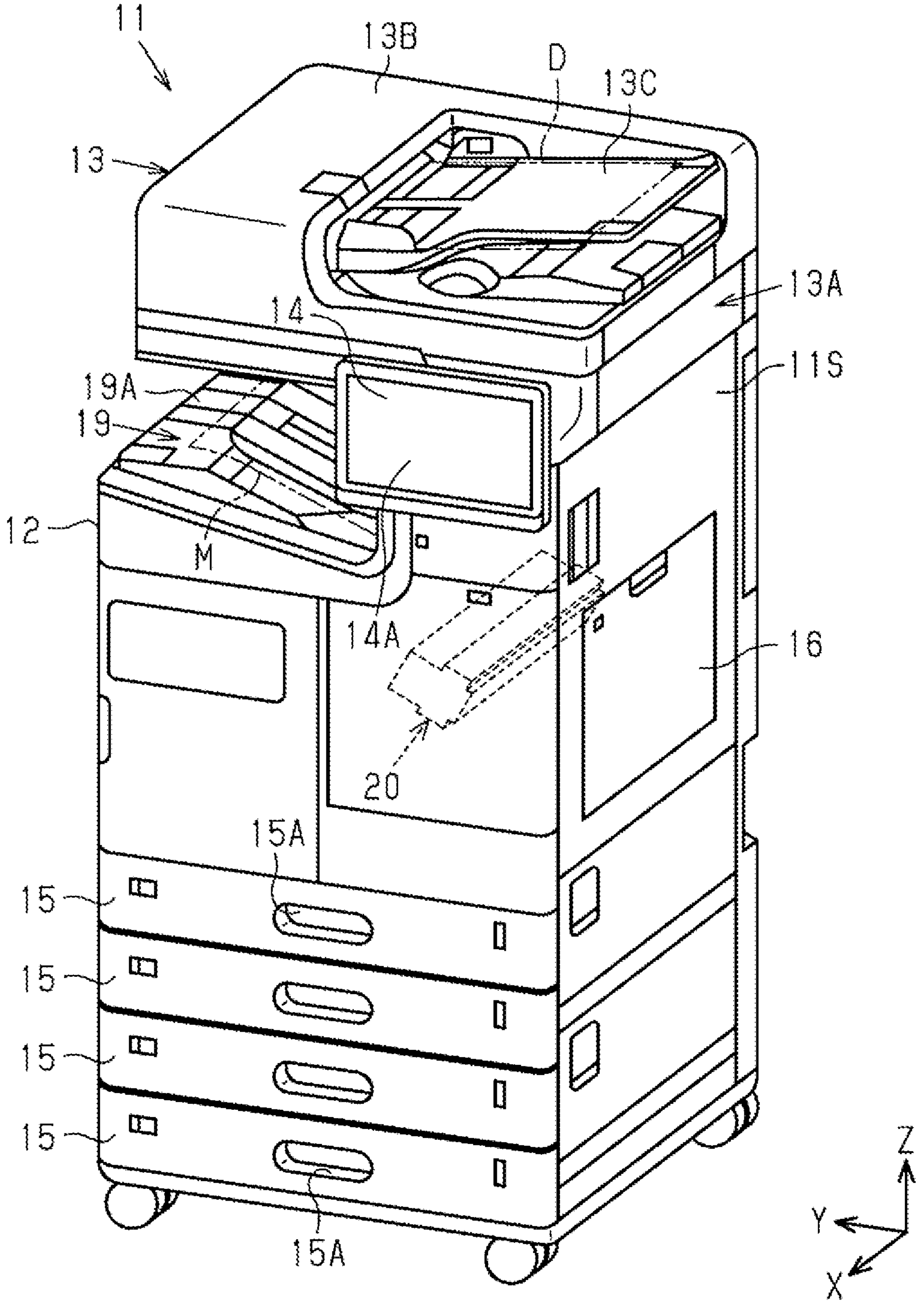
FIG. 1 is a perspective view illustrating a liquid ejection apparatus according to an embodiment.

A liquid ejection apparatus according to an embodiment will be described with reference to the drawings. In the drawings, a liquid ejection apparatus 11 is assumed to be placed on a horizontal installation surface. It is assumed that the axis orthogonal to the installation surface of the liquid ejection apparatus 11 is a Z-axis and that the two axes orthogonal to the Z-axis are an X-axis and a Y-axis. X directions parallel to the X-axis include both a +X direction and a −X direction. Y directions parallel to the Y-axis includes both a +Y direction and a −Y direction. Z directions parallel to the Z-axis are also referred to as vertical directions Z. Since the X directions coincide with a width direction of a medium M, the X directions are also referred to as width directions X.

Overall Structure of Liquid Ejection Apparatus 11

As illustrated in FIG. 1, the liquid ejection apparatus 11 is, for example, a multifunction printer. The liquid ejection apparatus 11 has a plurality of functions including a scanning function, a copying function, and a printing function. The liquid ejection apparatus 11 according to the embodiment performs printing using an ink jet printing method that ejects ink, which is an example of a liquid, onto a medium, such as paper. That is, the liquid ejection apparatus 11 is an ink jet printer having multifunction printer functionality.

The liquid ejection apparatus 11 includes an apparatus body 12 having a rectangular parallelepiped shape and an image reading portion 13 disposed above the apparatus body 12. The apparatus body 12 has a transport route T (see FIG. 2) along which the medium M, such as paper, is transported. The liquid ejection apparatus 11 includes a print portion 20 that performs printing on the medium M to be transported. The print portion 20 according to the embodiment uses a line printing method. The print portion 20 has an elongated shape that is longer than the width of the medium M in the width direction X. The print portion 20 performs printing on the medium M transported at a predetermined transport speed.

The image reading portion 13 includes a reading portion 13A and an automatic sheet feeding portion 13B. The image reading portion 13 includes a feed reading function and a flatbed reading function. In the feed reading function, the automatic sheet feeding portion 13B feeds a sheet D placed on a sheet tray 13C, and the reading portion 13A reads the sheet D that is being fed. On the other hand, in the flatbed reading function, the reading portion 13A reads the sheet D set on the sheet stage (not illustrated) that is exposed when the automatic sheet feeding portion 13B is opened. When the copy function is used, the liquid ejection apparatus 11 performs printing based on the read data read by the reading portion 13A from the sheet D.

As illustrated in FIG. 1, the liquid ejection apparatus 11 may include an operation portion 14 above the apparatus body 12. The operation portion 14 may include a display portion 14A including, for example, a touch panel. The user may give an instruction to the liquid ejection apparatus 11 by touching the display portion 14A. It should be noted that the operation portion 14 may include operation buttons.

The liquid ejection apparatus 11 may include a cassette 15 in which the plurality of media M can be accommodated. One or more cassettes 15 (for example, four as in FIG. 1) may be provided. The cassettes 15 are removably inserted into a portion below the apparatus body 12 in the X directions. The plurality of cassettes 15 store the media M, such as paper of different sizes or types. The user replaces or replenishes the media M in the cassette 15 by sliding the cassette 15 in the X directions with a handle 15A.

As illustrated in FIG. 1, the apparatus body 12 has, on a side surface 11S thereof, a feeding tray 16 on which the medium M can be placed. The feeding tray 16 is attached to the side surface 11S in an openable and closable manner. The retracted feeding tray 16 illustrated in FIG. 1 can be opened to form a predetermined posture angle for use by pivoting about the lower end thereof.

The liquid ejection apparatus 11 includes a print portion 20 that performs printing on the medium M. The print portion 20 performs printing on the medium M fed from the cassette 15 or the medium M fed from the feeding tray 16.

The liquid ejection apparatus 11 includes a discharge portion 19 that receives the printed medium M. The discharge portion 19 includes a discharge tray 19A on which the media M discharged from the apparatus body 12 are stacked.

Internal Structure of Liquid Ejection Apparatus 11

Next, the internal structure of the liquid ejection apparatus 11 will be described with reference to FIG. 2. The liquid ejection apparatus 11 includes, in the apparatus body 12, a transport portion 21 that transports the medium M and the print portion 20 that performs printing on the medium M. The print portion 20 includes an ejection head 20H that discharges the liquid, such as ink. The print portion 20 performs printing on the medium M by ejecting the liquid from the ejection head 20H. The liquid ejection apparatus 11 further includes a cap unit 40 and a wiping unit 50 (see FIGS. 3 to 6) as maintenance units that maintain the print portion 20.

Figure 2:
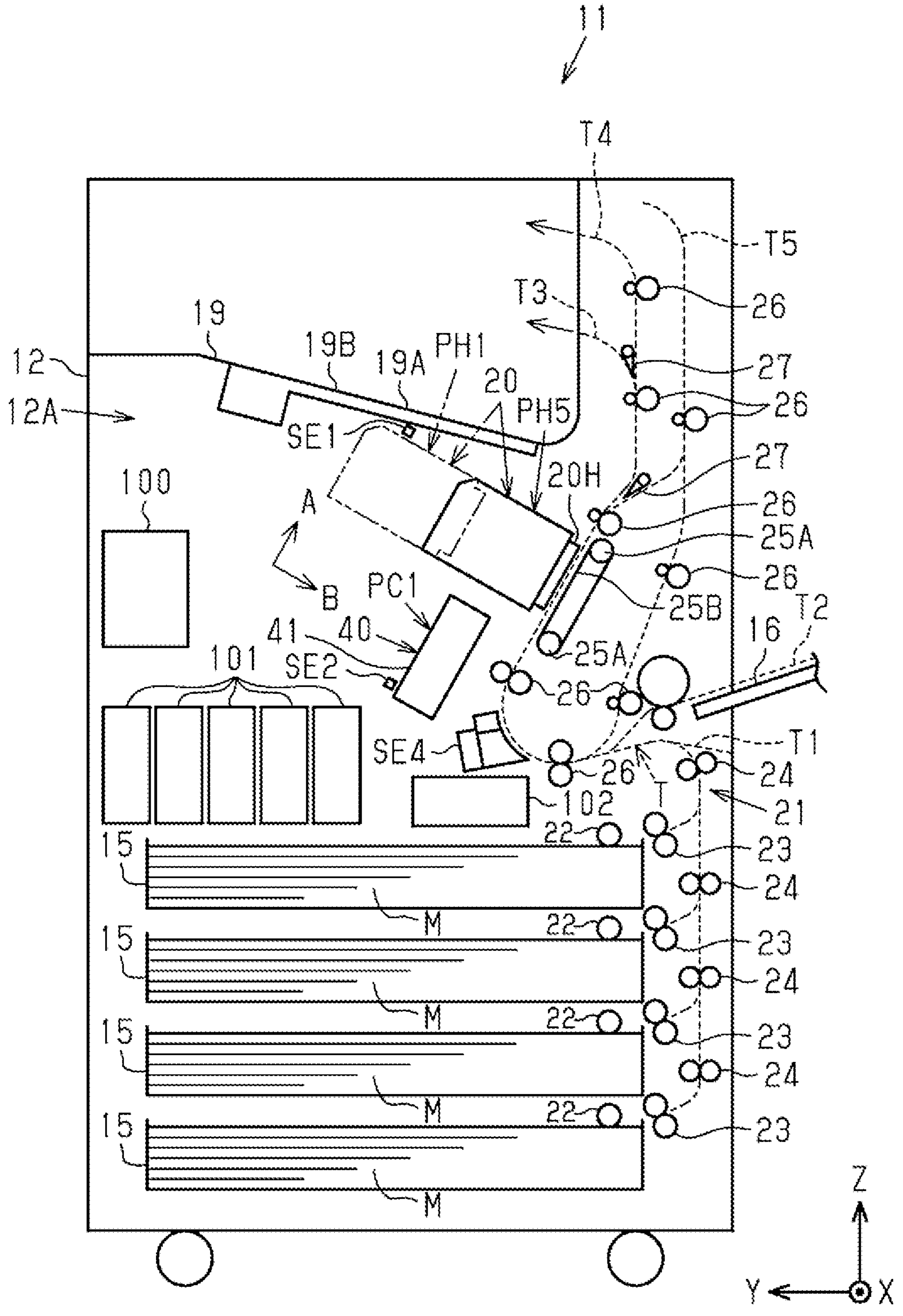
FIG. 2 is a schematic front sectional view illustrating an internal structure of the liquid ejection apparatus.

The transport portion 21 has the transport route T illustrated by the dashed line in FIG. 2 along which the medium M is transported. An AB coordinate system illustrated on a YZ plane is an orthogonal coordinate system. A directions coincide with the transport direction of the medium M at a print position facing the print portion 20. One of the A directions in the direction of the upstream side is referred to as a −A direction, and the other thereof in the direction of the downstream side is referred to as a +A direction. For example, the A directions are inclined at an acute angle with respect to the horizontal direction. It should be noted that the A directions may be parallel to the vertical direction Z.

As illustrated in FIG. 2, the print portion 20 is provided movably in B directions facing a transport belt 25B. The transport belt 25B supports the medium M at a position facing the print portion 20. The print portion 20 according to the embodiment moves in the B directions inclined by a predetermined angle with respect to the horizontal plane. One of the B directions in which the ejection head 20H approaches the transport belt 25B is a +B direction, and the other thereof in which the ejection head 20H moves away from the transport belt 25B is a −B direction. The B directions are orthogonal to the A directions on the YZ plane.

The print portion 20 is movable between a replacement position PH1 indicated by the dot-dot-dash line in FIG. 2 and a print position PH5 indicated by the solid line in FIG. 2. The print portion 20 can move to a plurality of positions including at least the replacement position PH1 and the print position PH5 by moving from the replacement position PH1 in the +B direction. It should be noted that, in the example, the B directions, which are the movement directions of the print portion 20, are also referred to as movement directions B.

The print position PH5 is a position at which the ejection head 20H ejects the liquid, such as ink, onto the medium M. The replacement position PH1 is a position at which users, service personnel, or the like replace the print portion 20 for maintenance or the like. A first sensor SE1 capable of detecting the print portion 20 may be disposed in the apparatus body 12. It should be noted that the print portion 20 located at the replacement position PH1 can be replaced through the opening that is exposed when the discharge tray 19A is removed. It should be noted that, since the print portion 20 moves in the B directions (+B directions), the print portion 20 can stop at a plurality of stop positions, such as the replacement position PH1, a retreat position PH2, a wiped position PH3, a capped position PH4, the print position PH5, and the like in this order in the +B direction.

The medium M stored in the cassette 15 is transported along the transport routes T by the pickup roller 22 and pairs of transport rollers 23 and 24. A transport path T1 extending from an external device and a transport path T2 extending from the feeding tray 16 provided on the apparatus body 12 meet the transport route T.

In addition, the transport belt 25B, a plurality of pairs of transport roller 26, a plurality of flaps 27, and a medium width sensor SE4 that detects the width the medium M in the X direction are disposed at positions along the transport route T. The transport belt 25B is looped around a pair of rollers 25A. A surface of the transport belt 25B that faces the print portion 20 serves as a support surface that supports the medium M at the print position. The flaps 27 have a function of switching the route along which the medium M is transported.

The transport route T forms a curved portion in a region facing the medium width sensor SE4 and extends in the A directions in the region downstream of this curved portion. A transport path T3 and a transport path T4 in the direction of the discharge portion 19 and a reversal path T5 on which the medium M is reversed are provided in a portion of the transport route T downstream of the transport belt 25B. The discharge portion 19 may be provided with the discharge tray (not illustrated) on which the medium M discharged from the transport path T4 can be placed. It should be noted that the reversal path T5 is a path to which the medium M is transported after the first side is printed but before a second side is printed during double-sided printing. The medium M having been reversed in the reversal path T5 is fed to the print position after passing along the transport route T again, and printing on the second side thereof is performed. It should be noted that the medium M may be adsorbed onto the transport belt 25B. In this case, the adsorption method may be an air adsorption method, an electrostatic adsorption method, or the like.

The ejection head 20H according to the embodiment is a line head. The ejection head 20H, which is a line head, has a plurality of nozzles 20N (see FIG. 7) with which printing can be performed across all portions of the medium M in the width direction X at the same time. The print portion 20 performs printing across all portions of the medium M in the width direction X without moving the medium M in the width directions X. The printed media M are discharged from the transport paths T3 and T4 and stacked on a loading surface 19B of the discharge tray 19A. It should be noted that the print portion 20 may adopt a serial printing method in which the print portion 20 is mounted on a carriage and ejects the liquid, such as ink or the like, while moving in the width directions X of the medium M.

As illustrated in FIG. 2, the liquid ejection apparatus 11 includes a cap portion 41 that maintains the print portion 20. The cap portion 41 is movable forward and backward in the A directions between the print portion 20 and the transport belt 25B. During printing, the cap portion 41 waits at a wait position PC1 illustrated in FIG. 2. While printing is not being performed, the cap portion 41 covers the ejection head 20H. The ejection head 20H has a nozzle surface 20A (see FIG. 7) in which the nozzles 20N (see FIG. 7) are open. The cap portion 41 caps the ejection head 20H while coming into contact with the nozzle surface 20A. Since an enclosed space communicating with the nozzles 20N is formed between the nozzle surface 20A and the cap portion 41 when the ejection head 20H is capped, the liquid, such as ink or the like, in the nozzles 20N is suppressed from thickening and drying out.

The liquid ejection apparatus 11 includes a control portion 100. The control portion 100 controls the liquid ejection apparatus 11. In addition, the control portion 100 controls the transport portion 21, the ejection head 20H, and the like. In addition, a liquid storage portion 101 that stores the liquid, such as ink or the like, and a waste liquid storage portion 102 that stores a waste liquid, such as ink or the like, are provided in the apparatus body 12. The liquid storage portion 101 is disposed lower than the nozzles 20N (see FIG. 7) of the ejection head 20H in the vertical direction Z. The liquid storage portion 101 supplies the liquid, such as ink or the like, to the ejection head 20H via a liquid supply path 73 (see FIG. 7), such as a tube. The ejection head 20H ejects the liquid supplied from the liquid storage portion 101.

Structure of Print Portion 20 and Maintenance Portion

Figure 3:
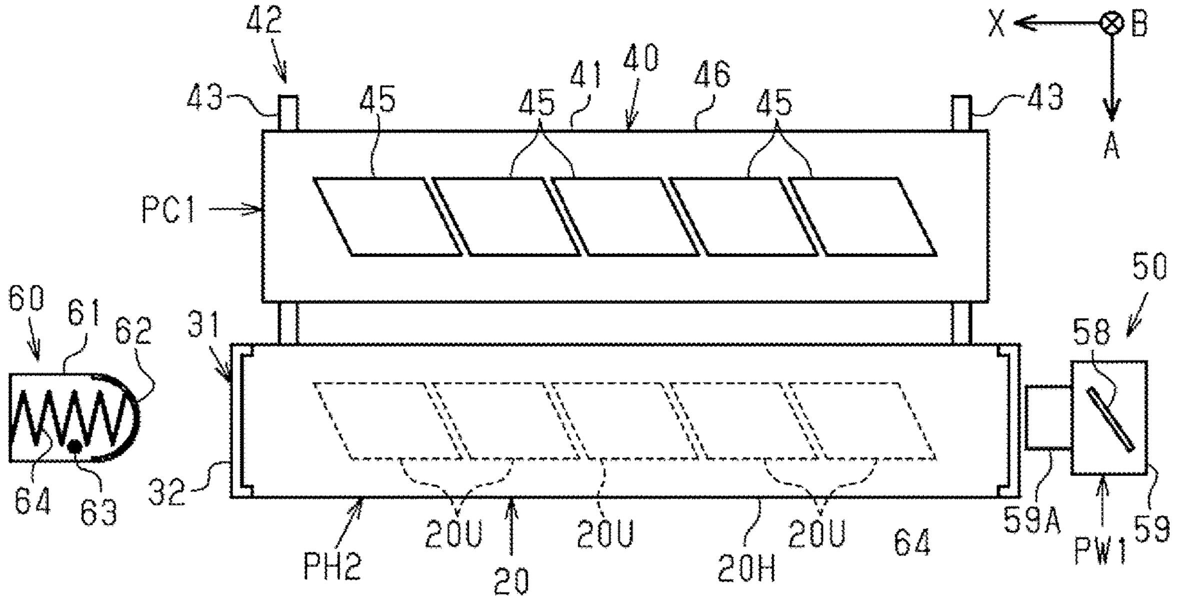
FIG. 3 is a schematic plan view illustrating a print portion and a maintenance portion, as seen in a B direction.
Figure 4:
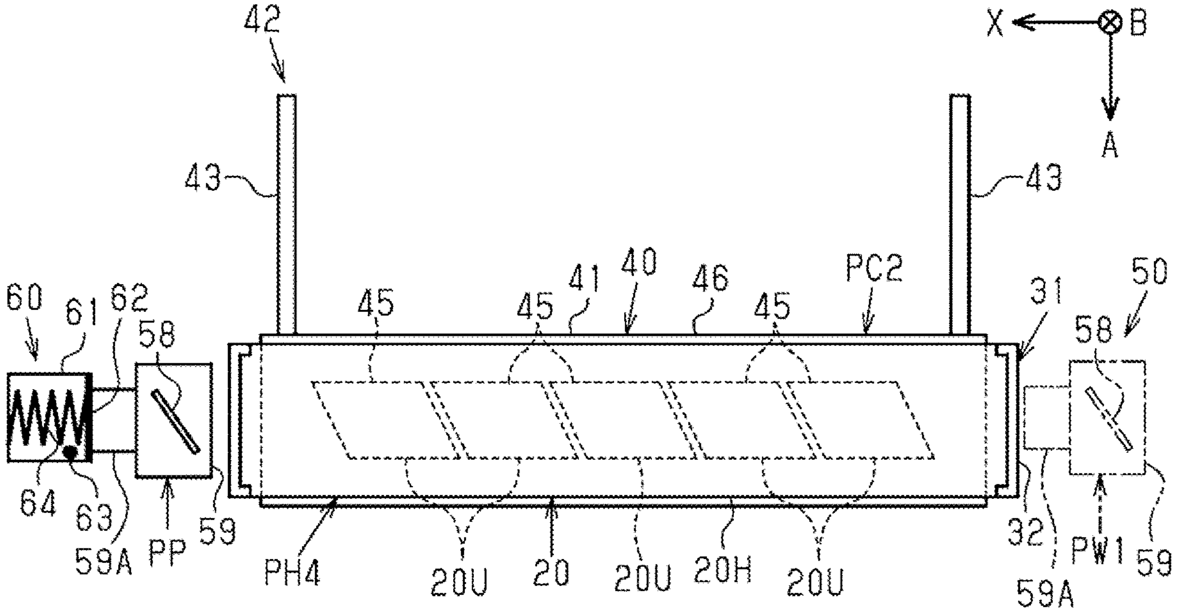
FIG. 4 is a schematic plan view illustrating maintenance operation, as seen in the B direction.

Next, the structure of the print portion 20 and the structure of the maintenance portion will be described with reference to FIGS. 3 to 6. It should be noted that FIGS. 3 and 4 illustrate the print portion 20 and the maintenance portion as seen in the B direction. The liquid ejection apparatus 11 according to the embodiment includes the cap portion 41 and a wiping portion 51 as the maintenance portions. That is, the liquid ejection apparatus 11 includes the cap unit 40 including the cap portion 41 and the wiping unit 50 including the wiping portion 51. It should be noted that FIGS. 5 and 6 illustrate the operation of the wiping portion 51.

First, the print portion 20 and a movement mechanism thereof will be described with reference to FIGS. 3 and 4. The liquid ejection apparatus 11 includes a first movement mechanism 31 that moves the print portion 20 in the movement directions B intersecting the nozzle surface 20A. The first movement mechanism 31 includes a guide rail 32 that guides the print portion 20 in the B directions (+B directions), a lifting motor 33 (see FIG. 17) as a driving source, and a power transmission mechanism (not illustrated) that transmits the driving force of the lifting motor 33 to the print portion 20. The power transmission mechanism includes, for example, a rack and pinion mechanism or a belt-type power transmission mechanism. When the lifting motor 33 is driven, the print portion 20 moves in the B directions while being guided by the guide rail 32.

Figure 5:
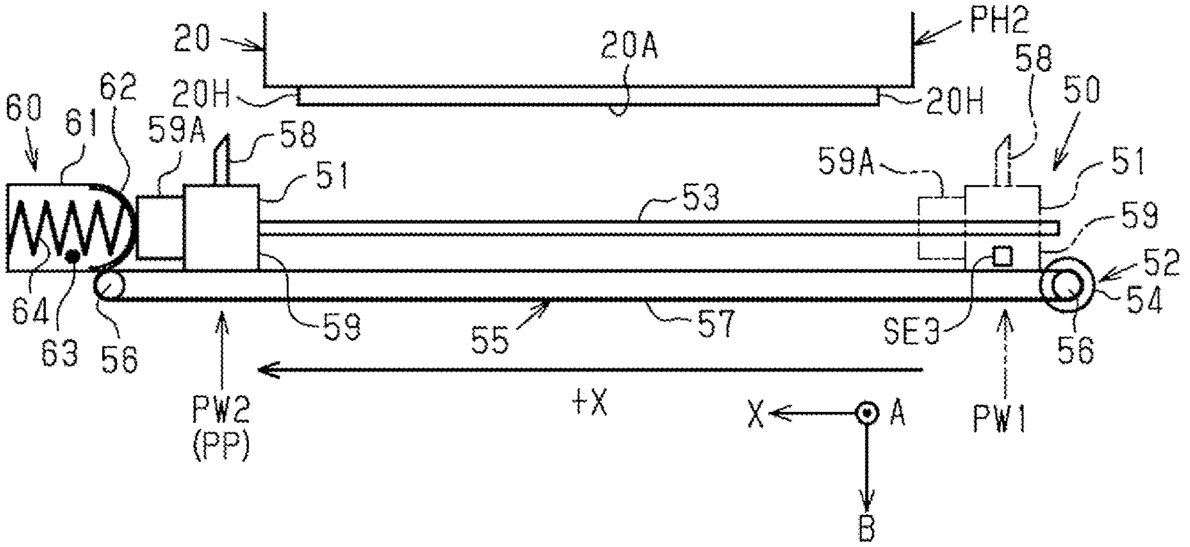
FIG. 5 is a schematic side view for describing pressurizing operation, as seen in a −A direction.
Figure 6:
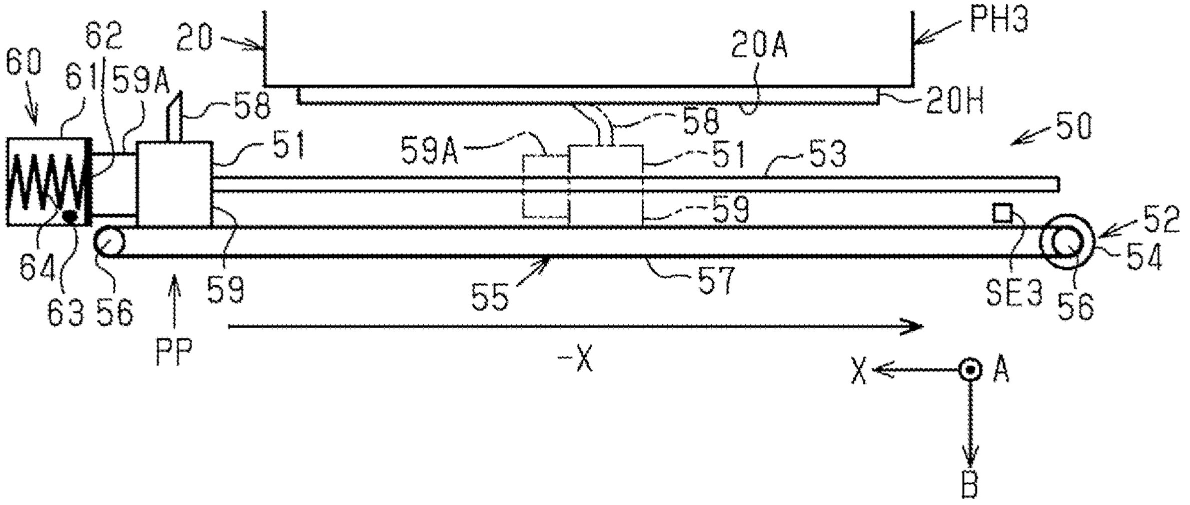
FIG. 6 is a schematic side view for describing wiping operation after pressurization, as seen in the −A direction.

When the print portion 20 does not perform printing, the print portion 20 moves to stop positions further than the print position PH5 from the transport belt 25B, such as the retreat position PH2 in FIG. 5, the wiped position PH3 in FIG. 6, and the capped position PH4. As illustrated in FIGS. 3 and 4, the ejection head 20H, which is a line head, includes a plurality of unit heads 20U in a range corresponding to the maximum width of the medium M. It should be noted that the ejection head 20H may include one line head having an elongated shape.

Structure of Cap Unit 40 and Structure of Wiping Unit 50

Next, the structure of the cap unit 40 and the structure of the wiping unit 50 will be described with reference to FIGS. 3 and 4. The cap unit 40 includes a second movement mechanism 42 that moves the cap portion 41. The second movement mechanism 42 includes a guide rail 43 that guides the cap portion 41 in the A directions (+A directions), a cap motor 44 (see FIG. 17) as a driving source, and the power transmission mechanism (not illustrated) that transmits the cap motor 44 power to the cap portion 41. The power transmission mechanism is, for example, a rack and pinion mechanism (not illustrated) or a belt-type power transmission mechanism. When the cap motor 44 is driven, the cap portion 41 moves in the A directions while being guided by the guide rail 43.

The cap portion 41 includes a plurality of caps 45 and a cap carriage 46 having the plurality of caps 45. The plurality of caps 45 are disposed at positions corresponding to the plurality of unit heads 20U. The cap portion 41 caps the ejection head 20H by covering the plurality of unit heads 20U with the plurality of caps 45. In addition, the caps 45 have a function of receiving liquid discharged from the nozzles 20N (see FIG. 7) of the ejection head 20H.

The cap portion 41 can move in the A directions between the wait position PC1 illustrated in FIG. 3 and a cap position PC2 illustrated in FIG. 4. When the print portion 20 is located at the retreat position PH2, the cap portion 41 can move to the cap position PC2 facing the ejection head 20H. When the print portion 20 lowers from the retreat position PH2 to the capped position PH4 with the cap portion 41 located at the cap position PC2 illustrated in FIG. 4, the cap portion 41 caps the ejection head 20H. That is, the plurality of caps 45 cap the plurality of unit heads 20U. During printing, the cap portion 41 waits at the wait position PC1. While waiting for printing, the cap portion 41 caps the print portion 20. In addition, cleaning of the ejection head 20H is performed while the cap portion 41 caps the print portion 20. It should be noted that details on cleaning will be described later.

Structure of Wiping Unit 50

As illustrated in FIGS. 3 to 6, the wiping unit 50 includes the wiping portion 51 and a third movement mechanism 52 that moves the wiping portion 51. As illustrated in FIGS. 5 and 6, the third movement mechanism 52 includes a guide rail 53, a wiper motor 54 (see FIG. 17) as a driving source, and a power transmission mechanism 55 that transmits the wiper motor 54 power to the wiping portion 51. The power transmission mechanism 55 is, for example, a belt-type power transmission mechanism. The power transmission mechanism 55 includes a pair of pulleys 56 and a timing belt 57 looped around the pair of pulleys 56. One of the pulleys 56 is attached to the output shaft of the wiper motor 54. When the wiper motor 54 is driven, the wiping portion 51 moves in the X directions (+X directions) while being guided by the guide rail 53. The X directions are orthogonal to the B directions, which are the movement directions of the print portion 20, and to the A directions, which are the movement directions of the cap portion 41. It should be noted that the power transmission mechanism 55 may be a rack and pinion mechanism.

The wiping portion 51 includes a wiper 58 and a wiper carriage 59 having the wiper 58. When the wiping portion 51 moves in the X directions, the cap unit 40 waits at the wait position PC1 illustrated in FIG. 3. The wiping portion 51 wipes the nozzle surface 20A of the plurality of unit heads 20U with the wiper 58 during at least one of an outward movement process in the +X direction and a return movement process in the −X direction. In the embodiment, the wiping portion 51 passes below the ejection head 20H having retreated to the retreat position PH2 in the outward movement process and wipes the nozzle surface 20A of the ejection head 20H disposed at the wiped position PH3 in the return movement process. In this way, the wiper 58 performs the wiping that wipes the nozzle surface 20A of the ejection head 20H. In the embodiment, the wiper 58 that performs the wiping that wipes the nozzle surface 20A for maintenance of the ejection head 20H corresponds to an example of the maintenance portion. In addition, the wiper carriage 59 having the wiper 58 corresponds to an example of the carriage.

The wiping portion 51 waits at a wait position PW1 illustrated in FIGS. 3 to 5. When the wiper motor 54 is driven forward, the wiping portion 51 moves outward in the +X direction. In this outward process, the print portion 20 retreats to the retreat position PH2 at which the print portion 20 does not come into contact with the wiper 58. The wiping portion 51 moves from the wait position PW1 to a turn position PW2 illustrated in FIG. 5. Next, the print portion 20 lowers to the wiped position PH3 illustrated in FIG. 6 at which the print portion 20 can come into contact the wiper 58. When the wiper motor 54 is driven in reverse with the print portion 20 disposed at the wiped position PH3, the wiping portion 51 returns in the −X direction. In the return movement process of the wiping portion 51, the wiper 58 wipes the nozzle surface 20A of the ejection head 20H. After wiping the nozzle surface 20A, the wiping portion 51 returns to the wait position PW1 indicated by the dot-dot-dash line in FIG. 5. It should be noted that the wiping portion 51 located at the wait position PW1 is detected by a third sensor SE3.

Structure of Pressurizing Mechanism 60

As illustrated in FIGS. 3 to 6, the pressurizing mechanism 60 is disposed at a position along the movement route of the wiper carriage 59. The pressurizing mechanism 60 is disposed in the liquid supply path 73 (see FIG. 7) by which the liquid storage portion 101 (see FIG. 7) and the ejection head 20H are coupled to each other. That is, the pressurizing mechanism 60 is disposed in the liquid supply path 73 via which the liquid is supplied from the liquid storage portion 101 to the ejection head 20H.

The pressurizing mechanism 60 includes a case 61 and a diaphragm 62, which is an example of the deforming member. The case 61 has a bottomed cylindrical shape having an opening at one end thereof to which the diaphragm 62 is assembled. The pressurizing mechanism 60 has the liquid storage chamber 63 enclosed by the case 61 and the diaphragm 62 since the diaphragm 62 is assembled onto the end portion of the opening of the case 61 to close the opening. The liquid storage chamber 63 forms a portion of the liquid supply path 73.

The pressurizing mechanism 60 has a spring 64, which is an example of the biasing member that biases the diaphragm 62 in a direction in which the volume of the liquid storage chamber 63 increases. The spring 64 is housed in the liquid storage chamber 63. Specifically, the spring 64 is housed in the liquid storage chamber 63 with both ends thereof in contact with the inner bottom surface of the case 61 and the inner surface of the diaphragm 62. The spring 64 biases the diaphragm 62 in a direction in which the volume of the liquid storage chamber 63 increases. The diaphragm 62 can be made to deform to change the volume of the liquid storage chamber 63. The diaphragm 62 is made of, for example, elastic synthetic resin or elastic rubber.

As illustrated in FIGS. 4 and 6, the wiper carriage 59 has a pressing portion 59A that can press the diaphragm 62 at a pressurized position PP. The pressing portion 59A has a convex shape that projects in the +X direction from a side surface of the wiper carriage 59 in the examples illustrated in FIGS. 4 and 6 but may have any shape as long as the pressing portion 59A can press and deform the diaphragm 62 by a required amount. For example, the pressing portion 59A need not have a convex shape and may press the diaphragm 62 by using the +X direction-side surface of the wiper carriage 59.

As illustrated in FIGS. 3 and 5, the volume of the liquid storage chamber 63 of the pressurizing mechanism 60 is increased by the biasing force of the spring 64 causing the diaphragm 62 to be extended outward. That is, the liquid accumulates in the liquid storage chamber 63. On the other hand, as illustrated in FIGS. 4 and 6, when the diaphragm 62 is pressed against the biasing force of the spring 64, the volume of the liquid storage chamber 63 of the pressurizing mechanism 60 decreases. That is, the liquid is pushed out from the liquid storage chamber 63 due to the liquid storage chamber 63 of the pressurizing mechanism 60 being pressurized.

It should be noted that the pressurized position PP may be a predetermined position in the X directions at which the diaphragm 62 can be pressurized or may be a region in a predetermined range in which the diaphragm 62 can be pressurized. When the pressurized position PP is a region in the predetermined range, the pressurized position PP corresponds to the range from a pressing start position at which the pressing portion 59A of the wiper carriage 59 comes into contact with the surface of the extended diaphragm 62 to a pressing end position at which the pressing portion 59A fully presses the diaphragm 62 as illustrated in FIGS. 4 and 6.

As described above, the wiper carriage 59, which is an example of the carriage, can press the diaphragm 62 at the pressurized position PP on the movement route. The wiper carriage 59 pressurizes the liquid storage chamber 63 by pressing the diaphragm 62 at the pressurized position PP and pressurizes the liquid in the nozzle 20N of the ejection head 20H that communicates with the pressurized liquid storage chamber 63. In the embodiment, the wiper carriage 59 causes the liquid in the nozzle 20N to flow in the discharge direction by pressurizing the liquid storage chamber 63 of the pressurizing mechanism 60. Particularly in this example, the amount of liquid that can be discharged from the nozzles 20N is limited to the volume of the liquid storage chamber 63 or less. Accordingly, the pressurization of the liquid storage chamber 63 results in simple pressurized cleaning that causes the liquid to be discharged from the nozzles 20N.

Structure of Pressurized Cleaning Mechanism

Next, the structure of a pressurized cleaning mechanism including the pressurizing mechanism 60 will be described with reference to FIGS. 7 to 10. It should be noted that the movement direction of the cap portion 41 corresponds to, for example, the vertical direction in FIGS. 7 to 10.

Figure 7:
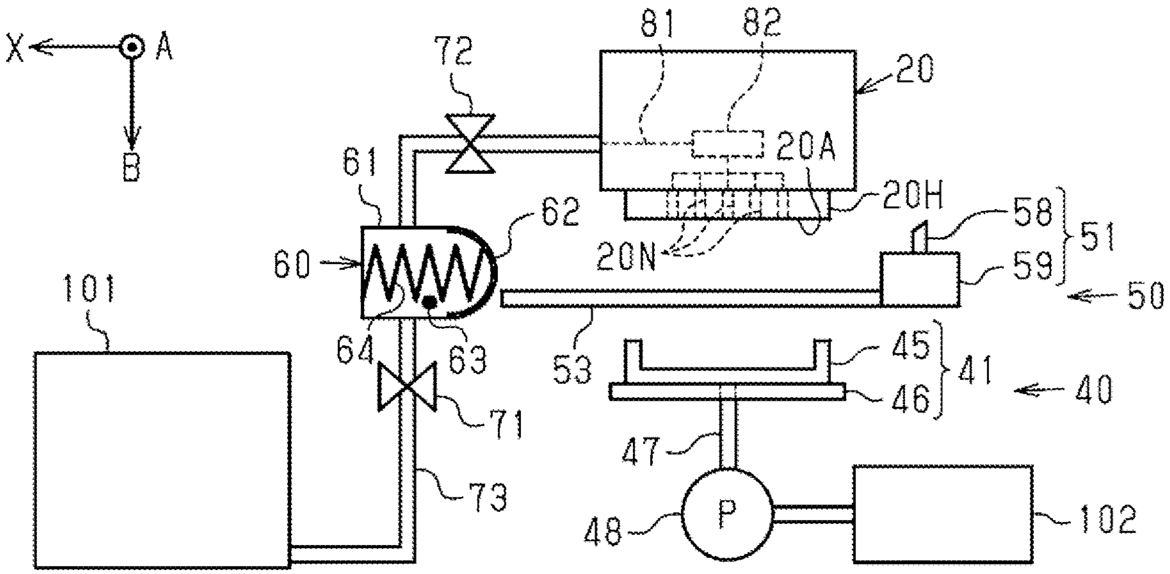
FIG. 7 is a schematic diagram illustrating a pressurizing mechanism and a maintenance mechanism.

As illustrated in FIG. 7, the pressurizing mechanism 60 is located on at a position along the movement route of the wiper carriage 59 or at a position near the movement route. The pressurizing mechanism 60 is disposed in the liquid supply path 73 by which the liquid storage portion 101 and the ejection head 20H are coupled to each other. The first on-off valve 71 that opens and closes the liquid supply path 73 is disposed in a portion of the liquid supply path 73 between the liquid storage portion 101 and the pressurizing mechanism 60.

The first on-off valve 71 is disposed in the liquid supply path 73 and located upstream of the pressurizing mechanism 60 in the liquid supply direction in which the liquid is supplied from the liquid storage portion 101 to the ejection head 20H.

In addition, a second on-off valve 72 that opens and closes the liquid supply path 73 is disposed in a portion of the liquid supply path 73 between the pressurizing mechanism 60 and the print portion 20. The second on-off valve 72 is disposed in the liquid supply path 73 and located downstream of the pressurizing mechanism 60 in the liquid supply direction. It should be noted that, in FIGS. 7 to 10, the open and close states of the first on-off valve 71 and the second on-off valve 72 are indicated in white to denote the open state and in black to denote the closed state.

As illustrated in FIG. 7, the print portion 20 has a flow path 81 by which the liquid supply path 73 communicates with the nozzles 20N. A liquid chamber 82 is present in the flow path 81. The liquid chamber 82 communicates with the nozzles 20N through a plurality of portions of the flow path 81 that have been branched downstream of the liquid chamber 82. As illustrated in FIG. 7, the nozzles 20N are located higher than the level of the liquid in the liquid storage portion 101 (see also FIG. 2). Accordingly, in a normal state in which the liquid storage chamber 63 of the pressurizing mechanism 60 is not pressurized, a pressure less than 1 atmosphere is applied to the ink in the liquid chamber 82 in the print portion 20 due to a water head difference. Accordingly, the liquid (for example, ink) does not drip from the nozzles 20N. On the other hand, when the ink in the flow path 81 and in the liquid chamber 82 is pressurized by the liquid storage chamber 63 of the pressurizing mechanism 60 being pressurized, the liquid is discharged from the nozzles 20N or the liquid is extended from the nozzles 20N even when the liquid is not discharged. In the embodiment, pressurized cleaning of the nozzles 20N is performed by causing the liquid to be discharge from the nozzles 20N. The thickened ink in the nozzles 20N and the bubbles in the ink are discharged from the nozzles 20N together with the leaking liquid. As a result, the cleaning of the nozzles 20N is performed. In addition, the pressurized cleaning also suppresses bubbles from entering the nozzles 20N because the wiper 58 performs wiping of the nozzle surface 20A.

Figure 8:
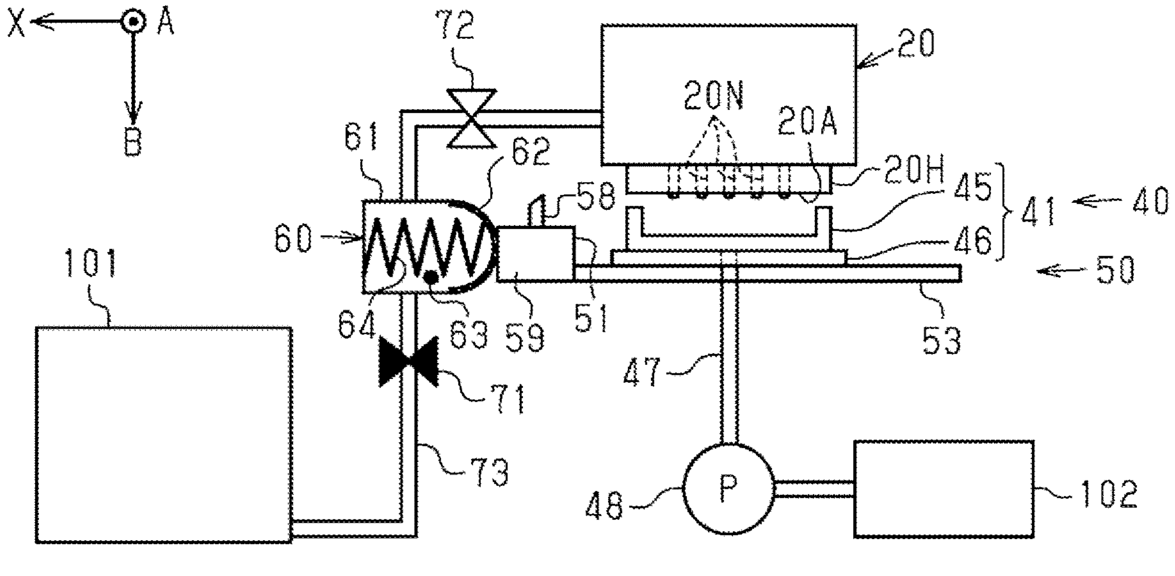
FIG. 8 is a schematic diagram illustrating the pressurizing mechanism and the maintenance mechanism.

In addition, as illustrated in FIG. 7, the cap unit 40 includes a tube 47 that couples the cap 45 and the waste liquid storage portion 102 to each other and a pump 48 that is present at a position along the tube 47. The pump 48 is, for example, a suction pump that exerts a suction force within the cap 45 by being driven. FIG. 8 illustrates a state in which the cap 45 is present at the cap position PC2 illustrated in FIG. 4. The cap 45 receives the liquid leaking from the nozzles 20N of the ejection head 20H during pressurized cleaning. When the pump 48 is driven, the liquid in the cap 45 is collected by the waste liquid storage portion 102 through the tube 47.

In addition, when the pump 48 is driven in a capping state in which the cap 45 is in contact with the nozzle surface 20A of the ejection head 20H, negative pressure is generated in a substantially enclosed space formed between the cap 45 and the nozzle surface 20A. This negative pressure causes main cleaning, which causes the liquid to be forcibly discharged from the nozzles 20N, to be performed. The main cleaning discharges the thickened liquid, bubbles, and the like from the nozzles 20N. This prevents or eliminates clogging of the nozzles 20N. The liquid (waste liquid) received by the cap 45 during the main cleaning is collected by the waste liquid storage portion 102 through the tube 47. It should be noted that the main cleaning is not limited to suction cleaning and may be pressurized cleaning that forcibly discharges the liquid from the nozzles 20N by pressurizing the liquid in the liquid storage portion 101.

As illustrated in FIG. 7, in the embodiment, pressurized cleaning is performed as simple cleaning, separately from the main cleaning. Pressurized cleaning is performed before the wiping portion 51 wipes the nozzle surface 20A of the ejection head 20H. The amount of the liquid discharged from the nozzles 20N in pressurized cleaning is less than that of the main cleaning. The pressurized cleaning is performed to properly perform wiping that causes the wiping portion 51 to appropriately wipe the nozzle surface 20A of the ejection head 20H. The purpose of pressurized cleaning that appropriately causes the wiping to be performed will be described in detail later.

Figure 9:
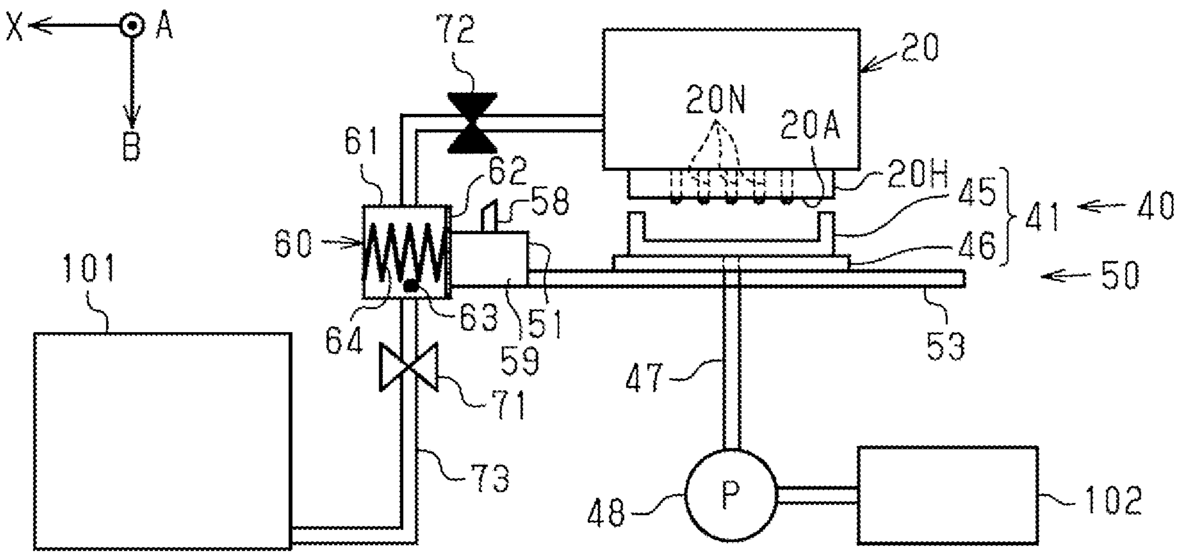
FIG. 9 is a schematic diagram illustrating the pressurizing mechanism and the maintenance mechanism.

As illustrated in FIGS. 8 and 9, the wiper carriage 59 presses the diaphragm 62 of the pressurizing mechanism 60. This causes the liquid to leak from the nozzles 20N. The control portion 100 pressurizes the liquid storage chamber 63 by moving the wiper carriage 59 to the pressurized position PP with the first on-off valve 71 closed and the second on-off valve 72 open. That is, when the wiper carriage 59 moves to the pressurized position PP, the pressing portion 59A of the wiper carriage 59 presses the diaphragm 62. When the diaphragm 62 is pressed, the liquid in the liquid storage chamber 63 is pushed out toward the print portion 20. As a result, the flow path 81 in the print portion 20 is pressurized. That is, when the wiper carriage 59 pressurizes the liquid storage chamber 63 at the pressurized position PP, the liquid in the nozzles 20N is pressurized. Since the first on-off valve 71 is closed at this time, the liquid is pushed out from the liquid storage chamber 63 toward the print portion 20.

The pressurization with the liquid pressed causes the liquid in the nozzle 20N to flow in the discharge direction. The amount of the liquid pushed out from the liquid storage chamber 63 notably exceeds the volume of the nozzles 20N. As a result, the liquid leaks from the nozzles 20N. The liquid having leaked from the nozzles 20N is received by the cap 45 disposed at the cap position PC2 facing the nozzle surface 20A. Since the amount of the liquid discharged from the nozzles 20N at this time is equal to the amount of the liquid pushed out from the liquid storage chamber 63 or less, the amount of the liquid discharged from the nozzles 20N is large enough to cause the liquid to leak from the nozzles 20N. In the simple pressurized cleaning, the amount of the liquid discharged from the nozzles 20N is considerably less than that of the main cleaning, but the thickened liquid and bubbles in the nozzles 20N can be relatively removed because the liquid in the nozzles 20N is discharged.

Then, as illustrated in FIG. 9, the second on-off valve 72 is closed with the interior of the ejection head 20H pressurized. As a result, pressurization of the flow path 81, the liquid chamber 82, and the nozzles 20N in the print portion 20 is maintained. The control portion 100 closes the second on-off valve 72 with the wiper carriage 59 located at the pressurized position PP after pressurizing the liquid storage chamber 63. The control portion 100 opens the first on-off valve 71 before the wiper carriage 59 moves away from the pressurized position PP.

Figure 10:
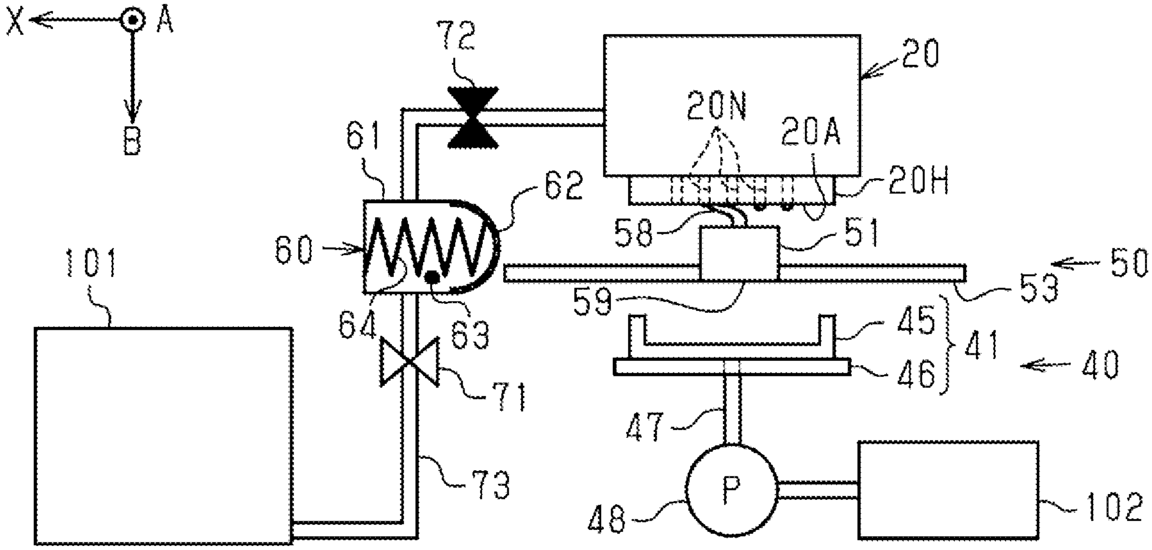
FIG. 10 is a schematic diagram illustrating the pressurizing mechanism and the maintenance mechanism.

As illustrated in FIG. 10, the wiper 58 wipes the ejection head 20H with the interior of the nozzle 20N pressurized. When the wiping portion 51 returns with pressurization of the print portion 20 maintained, the wiper 58 wipes the nozzle surface 20A of the ejection head 20H. In this way, the liquid having leaked from the nozzles 20N is wiped from the nozzle surface 20A.

Purpose of Pressurized Cleaning

Figure 11:
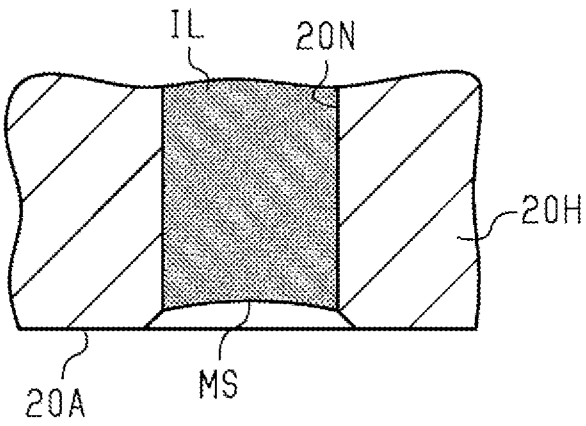
FIG. 11 is a schematic diagram illustrating wiping of an ejection head according to a comparative example.
Figure 12:
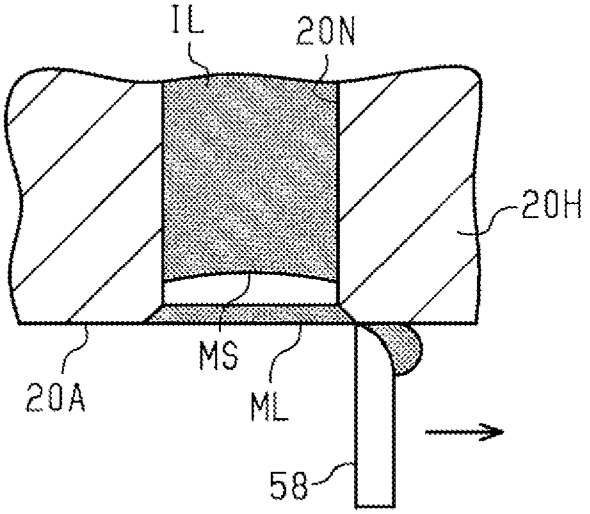
FIG. 12 is a schematic diagram illustrating wiping of the ejection head according to the comparative example.
Figure 13:
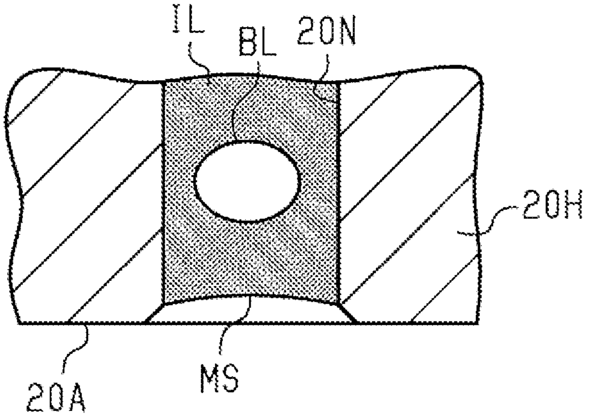
FIG. 13 is a schematic diagram illustrating wiping of the ejection head according to the comparative example.
Figure 14:
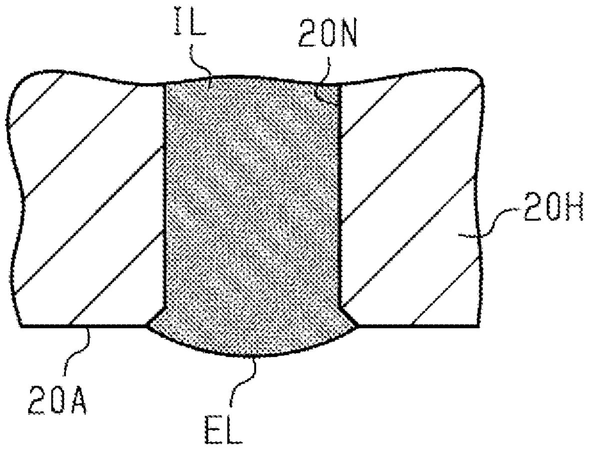
FIG. 14 is a schematic diagram illustrating wiping of the ejection head according to the example.
Figure 15:
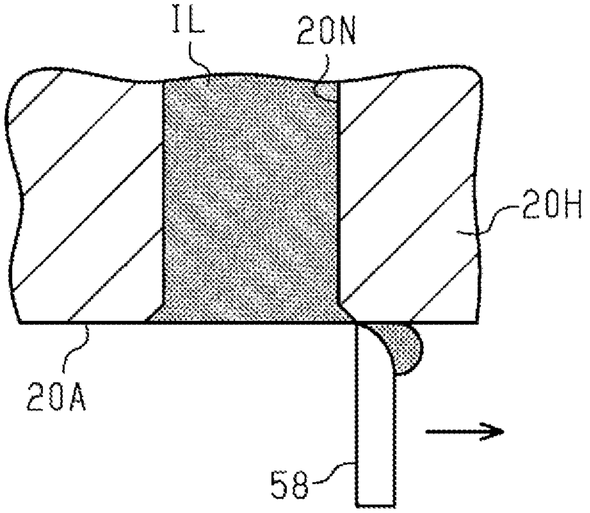
FIG. 15 is a schematic diagram illustrating wiping of the ejection head according to an example.
Figure 16:
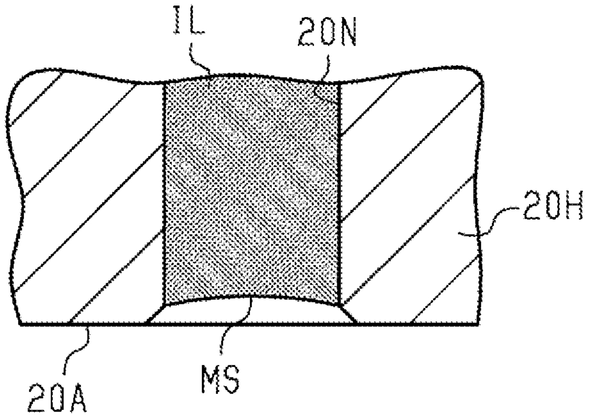
FIG. 16 is a schematic diagram illustrating wiping of the ejection head according to the example.

The purpose of pressurized cleaning will be described with reference to FIGS. 11 to 16. It should be noted that FIGS. 11 to 13 illustrate a comparative example in which wiping is performed while pressurized cleaning is not performed. In addition, FIGS. 14 to 16 illustrate examples in which wiping is performed in a pressurized state after pressurized cleaning.

First, the wiping in the comparative example will be described with reference to FIGS. 11 to 13.

As illustrated in FIG. 11, in the comparative example, wiping is performed with a liquid IL, such as ink or the like, in the nozzles 20N not pressurized. In the state in which the liquid IL in the nozzles 20N is not pressurized, a pressure less than 1 atmosphere is applied to the liquid IL in the liquid chamber 82 (see FIG. 7) of the ejection head 20H due to the water head difference between the liquid in the liquid storage portion 101 (see FIG. 7) and the liquid in the nozzles 20N. Accordingly, as illustrated in FIG. 11, a concave meniscus MS of the liquid IL, such as ink, is formed in the nozzle 20N.

When the wiper 58 wipes the nozzle surface 20A in this state as illustrated in FIG. 12, a liquid film ML is formed in the opening portion of the nozzle 20N. As a result, an air layer is formed between the meniscus MS and the liquid film ML. Then, this air layer becomes a bubble BL in the liquid IL in the nozzle 20N as illustrated in FIG. 13. That is, the bubble BL is mixed into the liquid IL in the nozzle 20N.

Next, the wiping in this example will be described with reference to FIGS. 14 to 16.

The wiping in the example causes the liquid IL to be discharged from the nozzle 20N during the wiping to suppress the bubble BL from being mixed into the liquid IL. In the state in which there is an extended liquid portion EL in which the liquid is extended from the nozzle 20N, the wiper 58 wipes the nozzle surface 20A as illustrated in FIG. 15. Since this prevents an air layer from being formed by the meniscus MS and the liquid film ML (see FIG. 12), the bubble BL (see FIG. 13) is suppressed from being mixed into the liquid IL in the nozzle 20N. Next, when the pressurization is released, the meniscus MS is formed in the liquid IL in the nozzle 20N as illustrated in FIG. 16.

Electrical Structure of Liquid Ejection Apparatus 11

Figure 17:
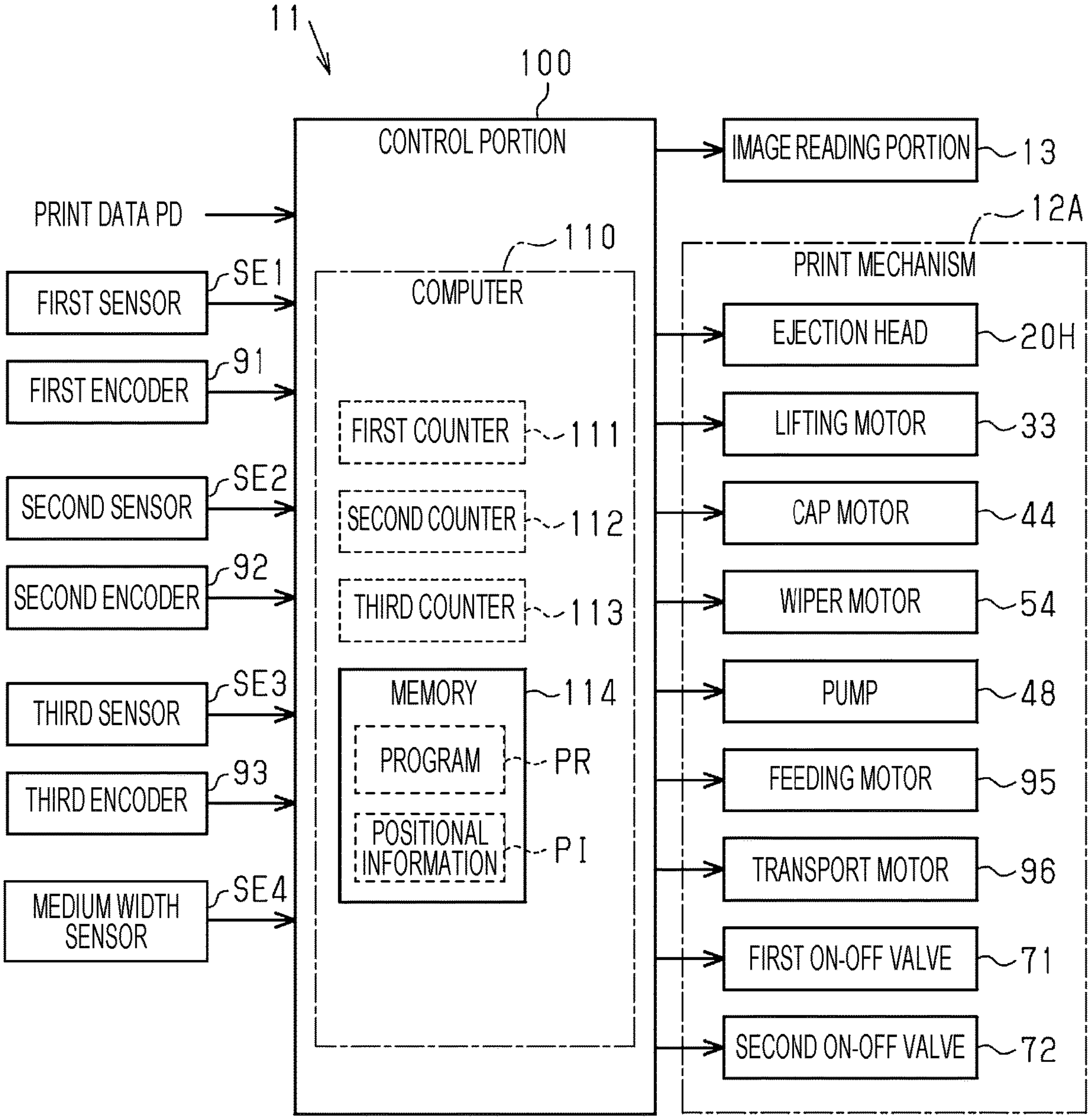
FIG. 17 is a block diagram illustrating an electric structure of the liquid ejection apparatus.

Next, the electrical structure of the liquid ejection apparatus 11 will be described with reference to FIG. 17. The liquid ejection apparatus 11 receives print data PD from, for example, a host apparatus (not illustrated). The print data PD includes printing condition information and image data. The control portion 100 is electrically coupled to the image reading portion 13 and components of a print mechanism 12A. The electrical components of the print mechanism 12A are the ejection head 20H, the lifting motor 33, the cap motor 44, the wiper motor 54, the pump 48, a feeding motor 95, a transport motor 96, the first on-off valve 71, the second on-off valve 72, and the like. The control portion 100 causes the print mechanism 12A to perform printing by controlling these electrical components.

The control portion 100 performs print control that ejects the liquid, such as ink, from the nozzles 20N by controlling the ejection head 20H. The control portion 100 performs movement control that moves the print portion 20 in the movement directions B by controlling the lifting motor 33. The control portion 100 performs cap movement control that moves the cap portion 41 in the A directions by controlling the cap motor 44. The control portion 100 performs wiper movement control that moves the wiper 58 in the X directions by controlling the wiper motor 54.

In addition, the control portion 100 performs the main cleaning that forcibly discharges the liquid, such as ink, from the nozzles 20N of the ejection head 20H by driving the pump 48. When the main cleaning is, for example, suction cleaning, the control portion 100 forcibly discharges the liquid, such as ink, from the nozzles 20N by driving the pump 48 including the suction pump coupled to the cap 45 to generate negative pressure in the cap 45 in contact with the nozzle surface 20A of the ejection head 20H. It should be noted that the main cleaning is not limited to suction cleaning. The main cleaning may be, for example, pressurized cleaning that forcibly discharges the liquid, such as ink, from the nozzles 20N by pressurizing the liquid storage portion 101.

The control portion 100 feeds the media M in the cassette 15 one by one by controlling the feeding motor 95 to rotate the pickup rollers 22 (see FIG. 2). In addition, the control portion 100 performs transport control that transport the medium M along the transport route T by controlling the transport motor 96 to drive the pairs of transport rollers 23 and 24 and the pair of transport rollers 26 and the transport belt 25B (see FIG. 2).

In addition, the first sensor SE1, a second sensor SE2, the third sensor SE3, and the medium width sensor SE4 are electrically coupled to the control portion 100. In addition, a first encoder 91, a second encoder 92, and a third encoder 93 are electrically coupled to the control portion 100.

In addition, the control portion 100 includes a computer 110. The computer 110 includes a central processing unit (CPU), a read-only memory (ROM), a random-access memory (RAM), and a storage, which are not illustrated. The control portion 100 controls the transport of the medium M in the liquid ejection apparatus 11 and printing on the medium M by the print portion 20. Specifically, the processing performed by the control portion 100 is not limited to software processing. For example, the control portion 100 may include a dedicated hardware circuit, such as an application-specific integrated circuit (ASIC), that performs hardware processing of at least a portion of the processing thereof. That is, the control portion 100 can be circuitry including one or more processors that operate according to computer programs (software) and one or more dedicated hardware circuits that perform at least a portion of various types of processing or a combination thereof. The processor includes a CPU, memories 114, such as a RAM, a ROM, and the like, and the memories 114 store program codes or instructions that cause the CPU to perform processing. The memories 114, which are computer-readable media, include any available media that can be accessed by a general or dedicated computer 110.

The computer 110 includes a first counter 111, a second counter 112, a third counter 113, and the memories 114 described above. The memories 114 store programs PR, positional information PI, and the like. The programs PR include programs for the pressurized cleaning control routine illustrated in the flowchart in FIG. 18. The positional information PI illustrated in FIG. 17 includes data for defining the stopping positions of the print portion 20, the cap carriage 46, and the wiper carriage 59. The positional information PI includes, for example, the position data of the pressurized position PP (see FIGS. 4 to 6) at which the wiper carriage 59 presses the diaphragm 62 of the pressurizing mechanism 60.

The first counter 111 counts, for example, a value indicating the position of the print portion 20 on the movement route with respect to the replacement position PH1 that is the origin. The first counter 111 counts, for example, the number of pulse edges of a detection signal input from the first encoder 91. When the first sensor SE1 detects the print portion 20 that has reached the replacement position PH1 during origin search operation of the print portion 20, the first counter 111 is reset.

The second counter 112 counts a value indicating the position of the cap portion 41 on the movement route with respect to the wait position PC1 that is the origin. The second counter 112 counts, for example, the number of pulse edges of a detection signal input from the second encoder 92. When the second sensor SE2 detects the cap portion 41 that has reached the wait position PC1 during origin search operation of the cap portion 41, the second counter 112 is reset.

The third counter 113 counts a value indicating the position of the wiping portion 51 on the movement route with respect to the wait position PW1 that is the origin. The third counter 113 counts, for example, the number of pulse edges of a detection signal input from the third encoder 93. When the third sensor SE3 detects the wiping portion 51 that has reached the wait position PW1 during origin search operation of the wiping portion 51, the third counter 113 is reset.

Operation of Embodiment

Next, the operation of the liquid ejection apparatus 11 will be described.

The user instructs the liquid ejection apparatus 11 to perform printing by operating the operation portion 14 or a input portion, such as a keyboard, of the host apparatus. The liquid ejection apparatus 11 receives print data PD from, for example, the host apparatus. The control portion 100 controls the transport portion 21 in accordance with a print command included in the print data PD and also controls the ejection head 20H in accordance with image data. In this way, the liquid ejection apparatus 11 prints an image and the like that are based on the image data on the medium M transported by the transport portion 21.

In addition, the liquid ejection apparatus 11 performs cleaning regularly or irregularly during power-on. For example, the control portion 100 performs cleaning each time a certain period of time elapses since the previous cleaning. Alternatively, the control portion 100 performs cleaning each time the count value indicating the number of printed sheets reaches a threshold indicating a predetermined number of sheets. Furthermore, when the liquid ejection apparatus 11 has a nozzle inspection device (not illustrated), the control portion 100 performs cleaning when the nozzle inspection device detects a defective nozzle that cannot properly eject droplets due to nozzle clogging or the like. These types of cleaning are the main cleaning that discharge a relatively large amount of liquid from the nozzles 20N.

On the other hand, there are cases in which the main cleaning is not necessary, but the simple cleaning including wiping is preferably performed. For example, the main cleaning is preferably performed when the periphery of the openings of the nozzles 20N is wet with liquid due to ink mist adhering to the periphery of the nozzles 20N on the nozzle surface 20A, or foreign matter such as paper dust is attached to cover the openings of the nozzles 20N. In these cases, droplets from the nozzles 20N hit the liquid or paper dust attached to the nozzle surface 20A, meet resistance, and accordingly, may be ejected in a direction deviating from a target direction. In this case, since the landing positions of droplets, which are dot formation positions, on the surface of the medium M deviate from the target positions, print quality reduces. Since the liquid and paper dust attached to the nozzle surface 20A need only be removed in this case, the main cleaning is not necessary. Wiping of the nozzle surface 20A may be sufficient. Accordingly, the control portion 100 performs the simple cleaning including wiping regularly or irregularly at shorter intervals than the main cleaning. The bubbles BL may be mixed into the liquid during wiping, as illustrated in FIGS. 12 and 13. Accordingly, in the simple cleaning, pressurized cleaning that causes the liquid to be discharged from the nozzles 20N by pressing the diaphragm 62 of the pressurizing mechanism 60 is performed.

Figure 18:
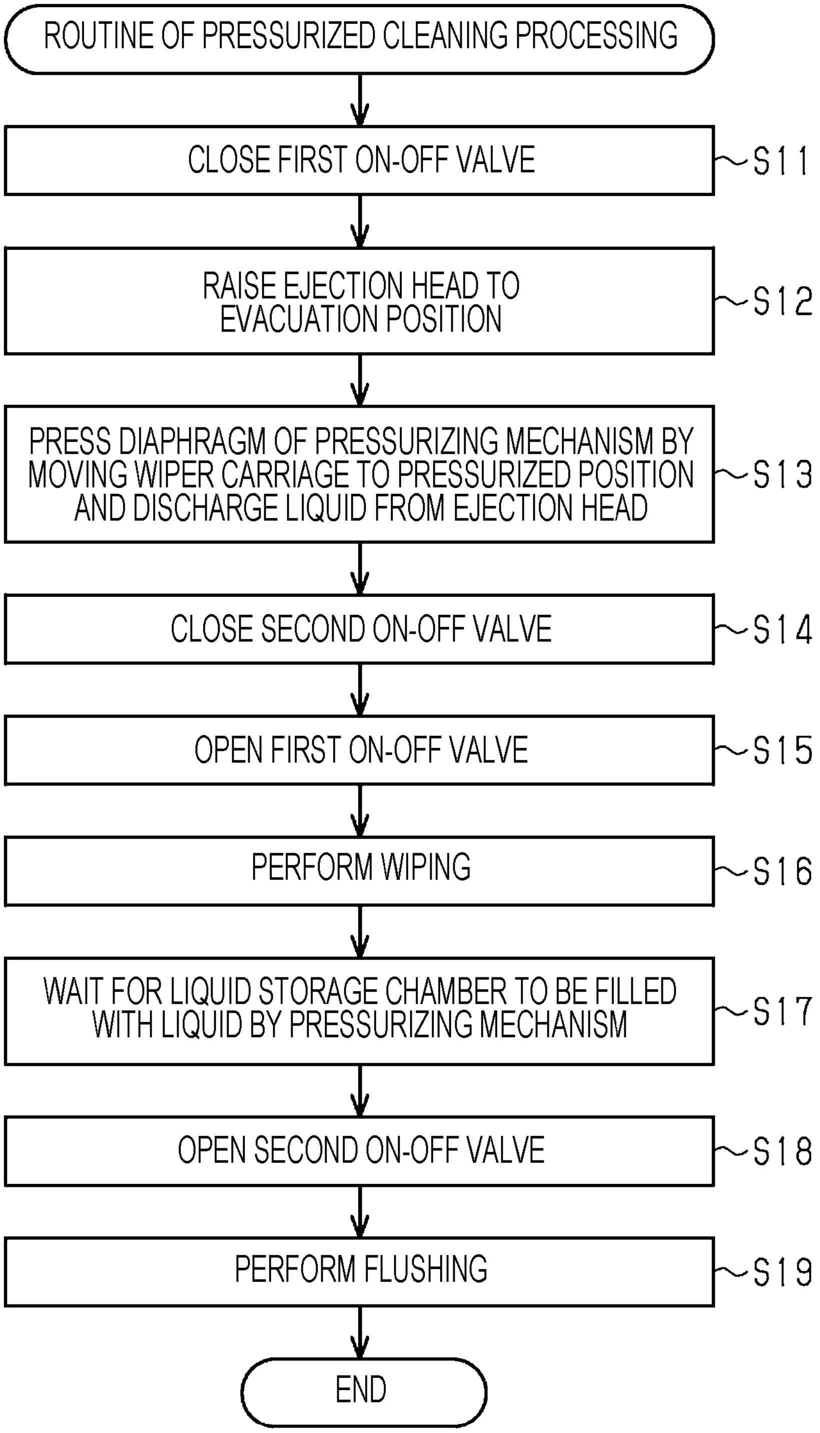
FIG. 18 is a flowchart illustrating the routine of pressurized cleaning processing.

The routine of pressurized cleaning processing will be described below with reference to FIG. 18. The computer 110 that constitutes the control portion 100 performs the simple cleaning of the ejection head 20H by performing the pressurized cleaning processing. It should be noted that, before the pressurized cleaning processing is performed, both the first on-off valve 71 and the second on-off valve 72 are open as in printing.

First, in step S11, the computer 110 closes the first on-off valve 71. Next, in step S12, the computer 110 raises the ejection head 20H to the retreat position PH2.

In step S13, the computer 110 moves the wiper carriage 59 to the pressurized position PP to presses the diaphragm 62 of the pressurizing mechanism 60 and discharge the liquid from the ejection head 20H. That is, as illustrated in FIG. 5, the wiping portion 51 moves to the pressurized position PP and then moves so as to press the diaphragm 62 in the range of the pressurized position PP. As a result, the pressing portion 59A of the wiper carriage 59 presses the diaphragm 62 and the liquid storage chamber 63 of the pressurizing mechanism 60 is pressurized. As illustrated in FIG. 8, when the liquid storage chamber 63 is pressurized to reduce the volume thereof with the first on-off valve 71 closed and the second on-off valve 72 open, the liquid in the liquid storage chamber 63 is partially pressurized and supplied to the ejection head 20H. As a result, the liquid leaks from the nozzles 20N. Since the cap portion 41 is located at the cap position PC2 opposite the ejection head 20H as illustrated in FIG. 4 at this time, the liquid leaked from the nozzles 20N is received by the cap 45. Leakage of the liquid from the nozzles 20N replaces some or all of the liquid within the nozzle 20N. For example, the thickened liquid in the nozzles 20N is discharged.

In step S14, the computer 110 closes the second on-off valve 72.

In step S15, the computer 110 opens the first on-off valve 71.

As a result, since the second on-off valve 72 is closed with the liquid storage chamber 63 of the pressurizing mechanism 60 pressurized as illustrated in FIG. 9, pressurization of the flow path 81 and the liquid chamber 82 in the ejection head 20H is maintained. This pressurization forms the extended liquid portion EL in which the liquid IL is extended from the opening of the nozzle 20N as illustrated in FIG. 14.

In step S16, the computer 110 performs wiping. Specifically, the computer 110 lowers the ejection head 20H from the retreat position PH2 to the wiped position PH3. Next, the computer 110 reversely drives the wiper motor 54. As a result, as illustrated in FIGS. 6 and 10, the wiping portion 51 returns in the −X direction from the pressurized position PP to the wait position PW1. In this return movement process, the wiper 58 wipes the nozzle surface 20A of the ejection head 20H. In this way, the liquid and paper dust adhering to the nozzle surface 20A are removed. At this time, as illustrated in FIG. 15, the extended liquid portion EL extended from the opening is wiped in the portion of the nozzle 20N. This prevents the bubble BL from being mixed into the liquid IL in the nozzle 20N during wiping. In addition, liquids of other colors are also likely to be suppressed from entering the nozzle 20N during wiping.

In step S17, the computer 110 waits for the liquid storage chamber 63 to be filled with ink by the pressurizing mechanism 60. When the wiping portion 51 starts moving in the return movement direction (−X direction) from the pressurized position PP, the spring 64 presses the diaphragm 62 such that the diaphragm 62 expands, and accordingly, the liquid storage chamber 63 is filled with liquid, such as ink. It takes a predetermined time until the liquid storage chamber 63 is filled with the liquid. Since the predetermined time is known in advance, the computer 110 waits the necessary predetermined time after the wiping portion 51 moves away from the pressurized position PP. For example, when the time required for the wiping portion 51 to move from the pressurized position PP to the wait position PW1 is equal to or longer than the predetermined time, the waiting time after the wiping portion 51 returns to the wait position PW1 may be 0 seconds. The second on-off valve 72 is closed until the liquid storage chamber 63 is filled with the liquid. Since this suppresses the liquid in the ejection head 20H from being drawn to the liquid storage chamber 63, air is prevented from entering the nozzles 20N.

In step S18, the computer 110 opens the second on-off valve 72. In this way, as illustrated in FIG. 7, both the first on-off valve 71 and the second on-off valve 72 are open. In step S19, the computer 110 performs flushing (dry discharge). Specifically, the computer 110 causes all the nozzles 20N of the ejection head 20H to eject droplets not related to printing. This flushing partially ejects, as droplets, the liquid in the nozzle 20N after wiping. Even when the liquid adhering to the nozzle surface 20A at wiping is partially pushed into the nozzles 20N, the liquid is partially discharged from the nozzles 20N by the flushing. The flushing replaces the liquid in the nozzle 20N and forms the meniscus MS on the surface of the liquid IL in the nozzles 20N.

Next, when printing is started, ejection is performed with the meniscus MS of a predetermined shape formed. Accordingly, the volume of droplets per discharge operation is less likely to vary. This suppresses variations in the size of print dots formed when droplets land on the medium M. The liquid ejection apparatus 11 according to the embodiment may perform ejection control that selects the sizes of droplets from the nozzles 20N of the ejection head 20H can be ejected to have a plurality of sizes. In this case, the sizes of droplets from the nozzles 20N can be appropriately ejected to have little variations.

Effects of Embodiment

According to the embodiment, the following effects can be obtained.

(1) The liquid ejection apparatus 11 includes the wiper carriage 59, which is an example of the carriage, and the pressurizing mechanism 60 disposed in the liquid supply path 73 via which the liquid from the liquid storage portion 101 is supplied to the ejection head 20H. The wiper carriage 59 has the wiper 58, which is an example of the maintenance portion that maintains the ejection head 20H for ejecting the liquid from the nozzles 20N. The pressurizing mechanism 60 includes the liquid storage chamber 63, which forms a portion of the liquid supply path 73, and the diaphragm 62, which is an example of the deforming member that can be deformed to change the volume of the liquid storage chamber 63. The wiper carriage 59 can press the diaphragm 62 at the pressurized position PP on the movement route. The wiper carriage 59 causes the liquid in the nozzles 20N of the ejection head 20H communicating with the liquid storage chamber 63 to flow in the discharge direction by pressing the diaphragm 62 at the pressurized position PP to pressurize the liquid storage chamber 63.

In this structure, since the liquid storage chamber 63 is enclosed by a portion of the liquid supply path 73 and the diaphragm 62, the structure of the pressurizing mechanism 60 is simplified. In addition, since the wiper carriage 59 of the maintenance portion is used to press the diaphragm 62 of the liquid storage chamber 63, the drive system that presses the diaphragm 62 to pressurize the liquid stored in the liquid storage chamber 63 can be simplified. Accordingly, the structure of the pressurizing mechanism 60 that pressurizes the ejection head 20H and the structure of the drive system that pressurizes the liquid storage chamber 63 of the pressurizing mechanism 60 can be simplified.

(2) Cleaning that forcibly discharges the liquid from the nozzles 20N by pressurizing the liquid storage chamber 63 is performed. In this structure, cleaning that forcibly discharges the liquid from the nozzle 20N by pressurizing the interior of the ejection head 20H is performed. The pressurizing mechanism 60 including the liquid storage chamber 63 in which the liquid for cleaning is stored can be realized with a simple structure.

(3) The deforming member is the diaphragm 62. In this structure, since the diaphragm 62 can be pressed to pressurize the interior of the ejection head 20H, the structure of the pressurizing mechanism 60 including the liquid storage chamber 63 can be simplified.

(4) The pressurizing mechanism 60 has the spring 64, which is the biasing member that biases the diaphragm 62 in a direction in which the volume of the liquid storage chamber 63 increases. When the wiper carriage 59 moves away from the diaphragm 62, the liquid storage chamber 63 is filled with the liquid from the liquid storage portion 101. In this structure, the structure of the pressurizing mechanism 60 that stores the liquid in the liquid storage chamber 63 after pressurization can be simplified.

(5) The ejection head 20H is a line head. In this structure, even when the ejection head 20H is a line head, the structure of the pressurizing mechanism 60 and the structure of the drive system that drives the pressurizing mechanism 60 can be simplified. For example, when the ejection head 20H is a serial head, a head carriage that moves the ejection head 20H can presses the diaphragm 62 of the pressurizing mechanism 60. However, even a line head not having this type of head carriage can press the diaphragm 62 of the pressurizing mechanism 60 by using the wiper carriage 59 of the maintenance portion.

(6) The maintenance portion is the wiper 58 that wipes the nozzle surface 20A of the ejection head 20H in which the nozzles 20N are open. The carriage is the wiper carriage 59 having the wiper 58. In this structure, the ejection head 20H can be pressurized by the wiper carriage 59 pressing the diaphragm 62 of the pressurizing mechanism 60. A dedicated carriage that presses the diaphragm 62 of the pressurizing mechanism 60 is not necessary. Accordingly, the structure of the drive system that drives the pressurizing mechanism 60 can be simplified. Ultimately, the structure of the liquid ejection apparatus 11 can be simplified.

(7) The liquid ejection apparatus 11 includes the first on-off valve 71, the second on-off valve 72, and the control portion 100. The first on-off valve 71 and the second on-off valve 72 are disposed in the liquid supply path 73. The first on-off valve 71 is located upstream of the pressurizing mechanism 60 in the liquid supply direction in which the liquid is supplied from the liquid storage portion 101 to the ejection head 20H. The second on-off valve 72 is located downstream of the pressurizing mechanism 60 in the liquid supply direction. The control portion 100 controls the wiper carriage 59, the first on-off valve 71, and the second on-off valve 72. The control portion 100 pressurizes the liquid storage chamber 63 by moving the wiper carriage 59 to the pressurized position PP with the first on-off valve 71 closed and the second on-off valve 72 open. In this structure, the liquid pushed out from the liquid storage chamber 63 by the wiper carriage 59 pressing the diaphragm 62 at the pressurized position PP can be effectively used to pressurize the interior of the ejection head 20H. For example, the volume of the liquid storage chamber 63 can be suppressed small. In this case, the structure contributes to the downsizing of the pressurizing mechanism 60.

(8) The control portion 100 closes the second on-off valve 72 with the wiper carriage 59 located at the pressurized position PP after pressurizing the liquid storage chamber 63. In this structure, even when pressing of the diaphragm 62 is released after the second on-off valve 72 is closed, pressurization of the interior of the ejection head 20H can be maintained. For example, when the wiper 58 wipes the ejection head 20H, bubbles can be suppressed from entering the nozzles 20N.

(9) The control portion 100 opens the first on-off valve 71 before the wiper carriage 59 moves away from the pressurized position PP. In this structure, after the ejection head 20H is pressurized, the liquid can be quickly stored in the liquid storage chamber 63. For example, the waiting time until the liquid storage chamber 63 is filled with a predetermined amount of liquid can be reduced.

(10) The wiper carriage 59 pressurizes the liquid in the nozzles 20N by pressurizing the liquid storage chamber 63 at the pressurized position PP, and the wiper 58 wipes the ejection head 20H in the pressurized state. In this structure, the nozzle surface 20A of the ejection head 20H can be wiped in a state in which the interior of the ejection head 20H is pressurized and the liquid is extended from the nozzles 20N. For example, bubbles can be suppressed from entering the nozzles 20N when the wiper 58 wipes the nozzle surface 20A of the ejection head 20H.

Modifications

The embodiment can practiced by being changed as described below. The embodiment and the modifications may be combined with each other within a scope that does not cause technical contradiction.

Figure 19:
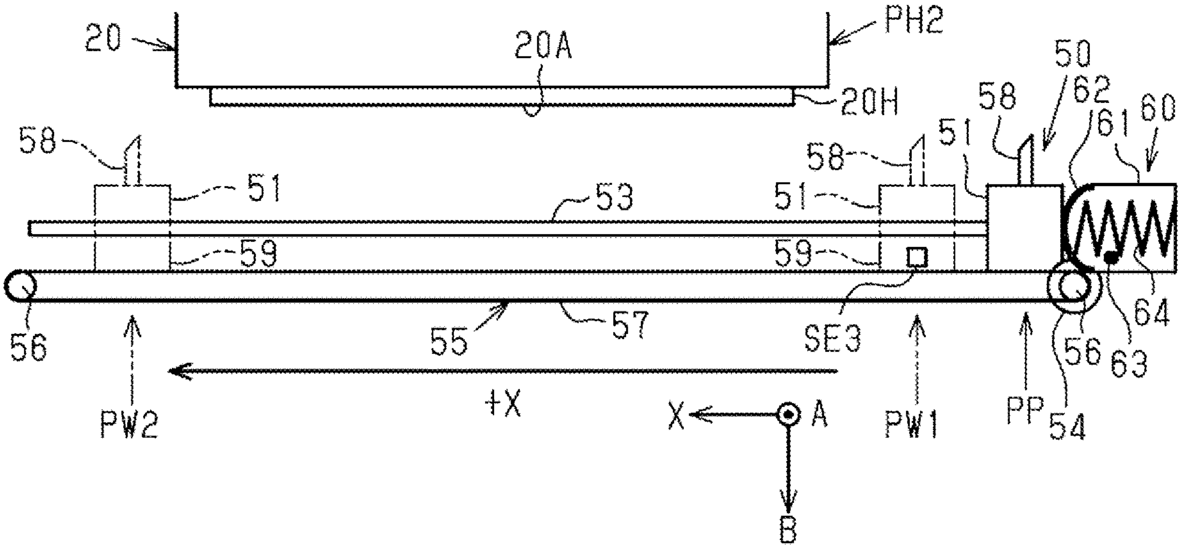
FIG. 19 is a schematic side view illustrating a pressurizing mechanism and a wiper unit according to a modification.

As illustrated in FIG. 19, the pressurized position PP may be a position to which the wiper carriage 59 moves from the wait position PW1 in a direction opposite to the movement direction during wiping. The wiper carriage 59 reaches the pressurized position PP by moving a short distance from the wait position PW1 in the direction opposite to the outward movement direction and presses the diaphragm 62 of the pressurizing mechanism 60 at the pressurized position PP. This pressing pressurizes the liquid chamber 82 (see FIG. 7) in the ejection head 20H. When the second on-off valve 72 (see FIG. 9 and the like) is closed after pressurization, pressurization of the liquid chamber 82 is maintained. The wiper carriage 59 moves outward in the +X direction from the pressurized position PP to the turn position PW2 by passing through the wait position PW1. After the ejection head 20H lowers to the wiped position PH3, the wiper carriage 59 wipes the nozzle surface 20A of the ejection head 20H with the wiper 58 in the process of returning from the turn position PW2. It should be noted that the wiping portion 51 may wipe the nozzle surface 20A during outward movement.

Figure 20:
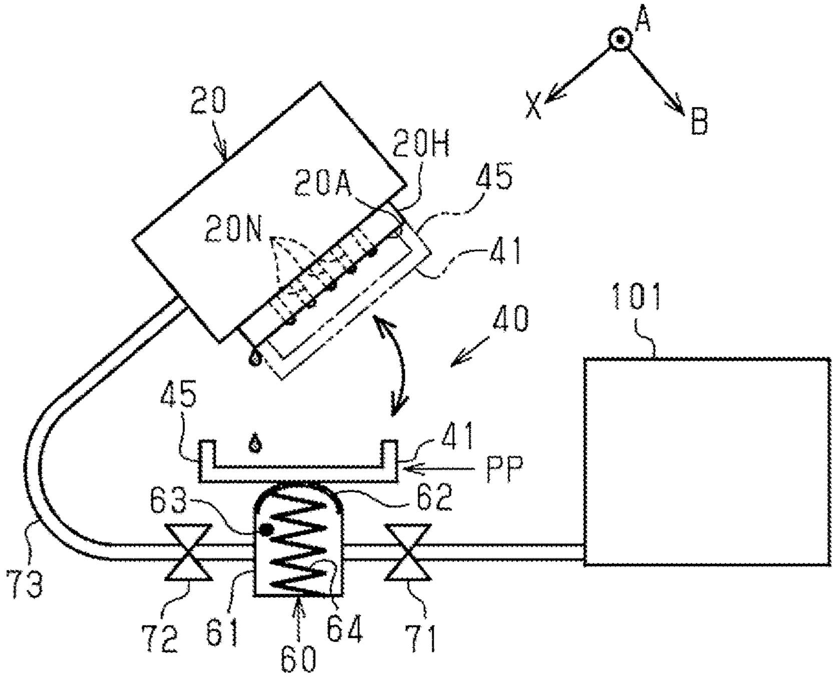
FIG. 20 is a schematic front view illustrating a pressurizing mechanism and a cap unit according to a modification that differs from the modification in FIG. 19.

The carriage may be the cap carriage 46 instead of the wiper carriage 59. That is, the maintenance portion may be the cap 45 that receives the liquid discharged from the nozzles 20N of the ejection head 20H. In addition, the carriage may be the cap carriage 46 having the cap 45. For example, as illustrated in FIG. 20, the nozzle surface 20A of the ejection head 20H is inclined with respect to a horizontal plane. The liquid that leaks from the nozzles 20N when pressurized runs down the nozzle surface 20A and drips from the lower end of the nozzle surface 20A. The cap 45 can take a first posture in which the cap 45 is in contact with the nozzle surface 20A and a second posture in which the cap 45 receives droplets dripping from the lower end of the nozzle surface. For example, the cap unit 40 illustrated in FIG. 20 has a tilting mechanism (not illustrated) that tilts the cap 45 and the cap carriage (not illustrated) into the first posture and the second posture. In the example in FIG. 20, the operation that tilts the cap 45 into the second posture causes the cap carriage to press the diaphragm 62 of the pressurizing mechanism 60 by using a portion of the bottom of the cap carriage as the pressing portion. This pressing pressurizes the liquid storage chamber 63. As a result, the liquid leaks from the nozzles 20N, and the leaked liquid runs down the nozzle surface 20A and drips from the lower end of the nozzle surface 20A. The dripped liquid is received by the cap 45 located at the pressurized position PP. When the second on-off valve 72 is closed after pressurization ends, pressurization of the liquid chamber that communicates with the nozzles 20N of the ejection head 20H is maintained. When the wiper carriage 59 (see FIG. 5 and the like) moves in this state, the nozzle surface 20A is wiped by the wiper 58.

Since the carriage moves on the movement route along which the maintenance portion moves to the wait position and the maintenance position as described above, the location of the carriage is not limited to the pressurized position PP. When the maintenance portion changes the posture angle thereof or can move in a different direction intersecting with the movement route, the maintenance portion or the maintenance carriage having the maintenance portion may press the diaphragm 62 of the pressurizing mechanism when moving on a route that differs the movement route. When the maintenance portion illustrated in FIG. 20 is the cap portion, the cap portion 41 may press the diaphragm 62 of the pressurizing mechanism 60 by pivoting or moving in a direction that differs from the movement route. The cap portion 41 can change the posture angle thereof in FIG. 20, but the cap portion 41 may press the diaphragm 62 by moving in a direction intersecting the movement route. Similarly, the wiping portion 51 may pivot or move in a direction that differs from the direction along the movement route, and the wiping portion 51 may press the diaphragm 62 of the pressurizing mechanism by pivoting or moving in the direction that differs from the direction of the movement route.

In this structure, the ejection head 20H can be pressurized by the cap carriage 46 pressing the diaphragm 62 of the pressurizing mechanism 60. A dedicated carriage that presses the diaphragm 62 of the pressurizing mechanism 60 is not necessary. Accordingly, the structure of the drive system that drives the pressurizing mechanism 60 can be simplified. Ultimately, the structure of the liquid ejection apparatus 11 can be simplified.

Figure 21:
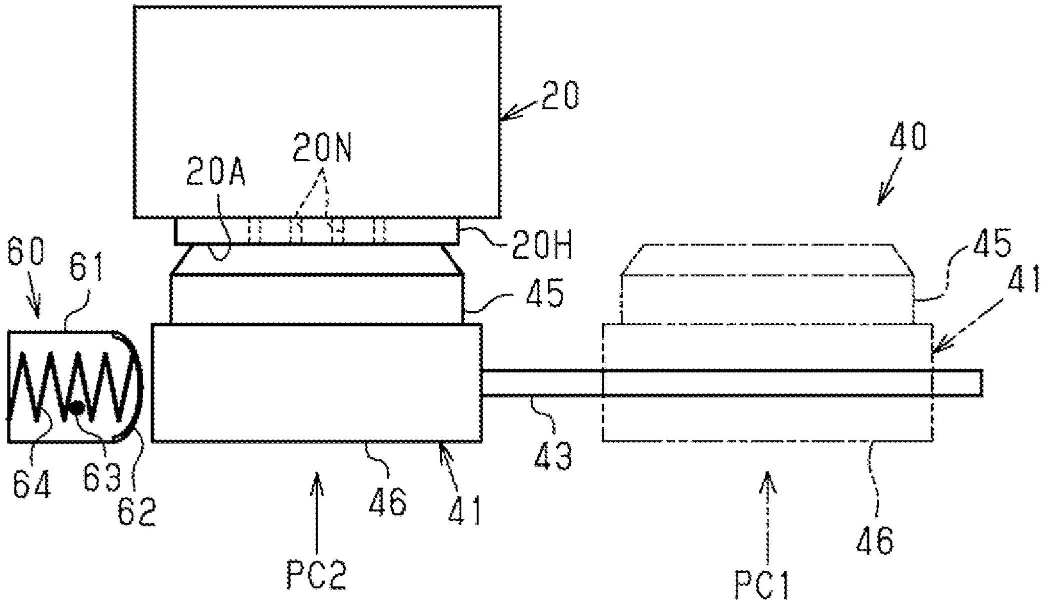
FIG. 21 is a schematic side view illustrating a pressurizing mechanism and a cap unit according to a modification that differs from the modification in FIG. 20.
Figure 22:
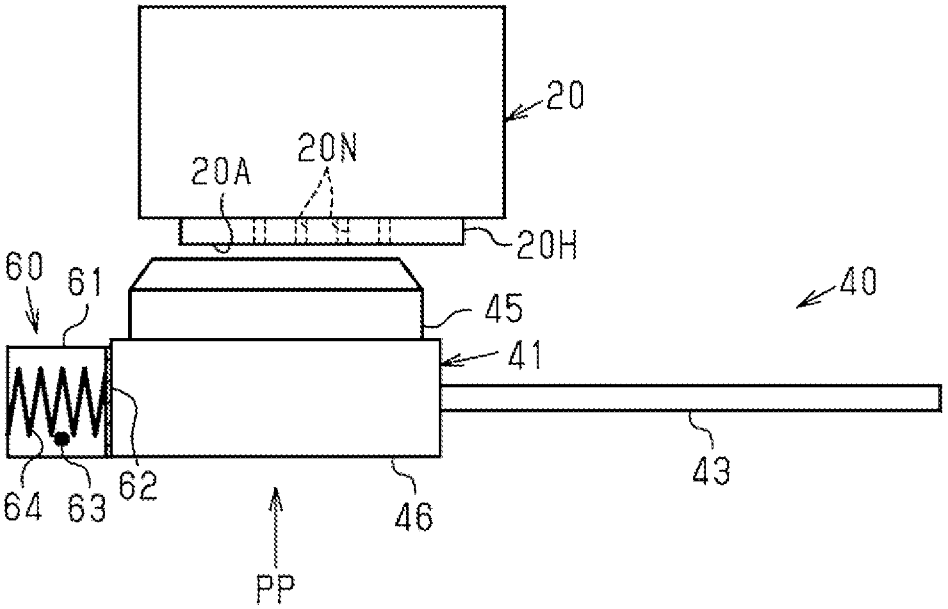
FIG. 22 is a schematic side view illustrating a pressurized state in which the cap portion presses the pressurizing mechanism.

The carriage that presses the diaphragm 62 of the pressurizing mechanism 60 by moving to the pressurized position PP along the movement route of the maintenance portion may be the cap carriage 46 illustrated in FIGS. 21 and 22. For example, as illustrated in FIGS. 21 and 22, the cap carriage 46 having the cap 45, which is an example of the maintenance portion, can move along the guide rail 43 on the movement route including the wait position PC1 and the cap position PC2. As illustrated in FIG. 21, the cap 45 comes into contact with the nozzle surface 20A of the ejection head 20H at the cap position PC2 and thereby caps the ejection head 20H. The main cleaning is performed in this capping state. The pressurized position PP is set in a location that differs from the cap position PC2. As illustrated in FIG. 22, the cap portion 41 moves along the guide rail 43 to the pressurized position PP on the movement route, and accordingly, the cap carriage 46 presses the diaphragm 62 of the pressurizing mechanism 60. In this case, the cap 45 at the pressurized position PP is disposed at a position at which the cap 45 can receive the liquid leaking from the nozzles 20N of the ejection head 20H. Accordingly, the cap portion 41 pressurizes the ejection head 20H and receives the liquid leaking from the nozzles 20N at the same time. Likewise, in this structure, the pressurizing mechanism 60 needs only one liquid storage chamber 63, and a dedicated carriage that presses the diaphragm 62 of the pressurizing mechanism 60 is not necessary. Accordingly, the structure of the pressurizing mechanism 60 and the structure of the drive system that drives the pressurizing mechanism 60 can be simplified. Ultimately, the structure of the liquid ejection apparatus 11 can be simplified.

The deforming member may also be a bellows. For example, the pressurizing mechanism includes an accordion-fold bellows and a spring, which is an example of the biasing member, housed in the chamber of the bellows. A biasing force of the spring deforms the bellows in a direction in which the volume of the bellows increases. The liquid chamber in the bellows communicates with the liquid supply path 73 that couples the liquid storage portion 101 and the print portion 20 to each other. In the liquid supply path 73, the first on-off valve 71 disposed upstream of the pressurizing mechanism 60 in the liquid supply direction and the second on-off valve 72 disposed downstream of the pressurizing mechanism 60 are present. Even the pressurizing mechanism 60 having the bellows as the deforming member can perform pressurized cleaning, which is the simple cleaning, as in the embodiment described above.

The pressurization of the pressurizing mechanism 60 need not be accompanied by leakage (discharge) of the liquid from the nozzles 20N. That is, the pressurization may only extend the liquid from the openings of the nozzles 20N. In this case, since the surface tension of the liquid is extended from the openings of the nozzles 20N is larger than the gravitational force acting on the liquid, the liquid does not drip. Likewise, in this structure, bubbles can be suppressed from entering the nozzles 20N when the wiper 58 wipes the nozzle surface 20A of the ejection head 20H.

The biasing member, such as the spring 64, that constitutes the pressurizing mechanism 60 may be eliminated. For example, the deforming member, such as the diaphragm 62, may be restored in a direction in which the volume of the liquid storage chamber 63 increases when not pressed. In this case, the deforming member is restored in a direction in which the volume thereof increases when the carriage moves away from the pressurized position PP at which the carriage presses the deforming member, the liquid storage chamber 63 can be filled with liquid from the liquid storage portion 101.

The simple cleaning may be performed by the nozzle surface 20A being wiped and then the deforming member of the pressurizing mechanism being pressed.

The wiper 58 is not limited to a wiper blade and may be a cloth wiper.

The biasing member is not limited to the spring 64 and may be a rubber member.

The biasing member, such as the spring 64, that biases the deforming member, such as the diaphragm 62, in a direction in which the volume of the liquid storage chamber 63 increases need not be provided.

The support portion that supports the medium M at a position facing the print portion 20 is not limited to the transport belt 25B and may be, for example, a platen. In addition, in the case of the transport belt 25B, the transport belt 25B may be an electrostatic type or an adsorption type.

The liquid ejection apparatus 11 may be a printing apparatus that performs printing on the medium by ejecting a liquid, such as ink, onto a fabric, which is an example of the medium.

The liquid ejection apparatus 11 may be an ink jet printer having a feeding portion with a roll around which a long medium M, such as roll paper, is wound.

An ejection drive element incorporated in the ejection head 20H to eject a liquid, such as ink, from the nozzles 20N may be a driving system of a piezoelectric type, an electrostatic type, a bubble type, or the like.

The liquid ejection apparatus 11 is not limited to a line printer and may be a serial printer or a page printer. When the liquid ejection apparatus 11 is a serial printer, the liquid ejection apparatus 11 includes a head carriage having the ejection head 20H and performs printing on the medium M by the ejection head 20H ejecting a liquid toward the medium M supported by a support portion, such as a platen, while the head carriage moves in a scanning direction (for example, in the width direction X of the medium M). Likewise, in this structure, a carriage, such as the wiper carriage, that has the maintenance portion can be used as a drive system that presses the deforming member of the pressurizing mechanism 60.

The liquid ejection apparatus 11 is not limited to a multifunction printer and need not include the image reading portion 13.

The medium M may be paper, a plastic sheet or film, a metal sheet or film, a medium containing paper and plastic, a laminate sheet including metal and plastic, or the like.

The liquid ejection apparatus 11 is not limited to a print apparatus that ejects ink, which is an example of a liquid. The liquid ejection apparatus 11 may eject a liquid other than ink. The liquid discharged as droplets from the liquid ejection apparatus 11 may be granular, tear-like, and thread-like. The liquid here may be any material that can be ejected from the liquid ejection apparatus 11. For example, the liquid may be a substance in a liquid phase and includes a fluid substance, such as a liquid form substance having high or low viscosity, sol, gel water, another inorganic solvent, an organic solvent, a solution, a liquid resin, liquid metal, such as metal melt. The liquid includes not only a liquid that is one state of a substance but also particles of a functional material including solid materials, such as pigments and metal particles, that are dissolved, dispersed, or mixed in a solvent. Typical examples of the liquid are the ink as described in the embodiment above, liquid crystal, and the like. Here, the ink includes various liquid compositions, such as general water-based ink, oil-based ink, gel ink, and hot-melt ink. A specific example of the liquid ejection apparatus 11 is an apparatus that ejects a liquid containing, as dispersed or dissolved materials electrode materials and coloring materials used to manufacture, for example, a liquid crystal display, an electroluminescent (EL) display, a surface emitting display, a color filter, or the like. The liquid ejection apparatus 11 may also be an apparatus that ejects biological organic matter used to manufacture biochips, an apparatus that is used as a precision pipette and ejects a liquid sample, a printing apparatus, a micro dispenser, or the like. The liquid ejection apparatus 11 may also be an apparatus that ejects a lubricant to a precision instrument, such as a watch or a cameras, with surgical precision or an apparatus that ejects a transparent resin liquid, such as an ultraviolet curing resin, onto a substrate to form a micro hemispherical lens (optical lens) used as an optical communication element or the like. The liquid ejection apparatus 11 may also be an apparatus that ejects an acid or alkali etching solution to etch a substrate or the like.

The technical idea derived from the embodiment and modifications thereof and the operation and effects thereof will be described below.

(A) A liquid ejection apparatus includes: a carriage having a maintenance portion that maintains an ejection head ejecting a liquid from a nozzle; and a pressurizing mechanism disposed in a liquid supply path via which a liquid from the liquid storage portion is supplied to an ejection head, in which the pressurizing mechanism includes a liquid storage chamber that forms a portion of the liquid supply path and a deforming member configured to be deformed to change a volume of the liquid storage chamber, the carriage is configured to press the deforming member at a pressurized position on a movement route, and the carriage causes a liquid in the nozzle of the ejection head communicating with the liquid storage chamber to flow in a discharge direction by pressing the deforming member at the pressurized position to pressurize the liquid storage chamber.

In this structure, since the liquid storage chamber is enclosed by a portion of the liquid supply path and the deforming member, the structure of the pressurizing mechanism can be simplified. In addition, since the carriage of the maintenance portion is used to press the deforming member of the liquid storage chamber, the structure of the drive system that presses the deforming member to pressurize the liquid stored in the liquid storage chamber can be simplified. Accordingly, the structure of the pressurizing mechanism that pressurizes the ejection head and the structure of the drive system that pressurizes the liquid storage chamber of the pressurizing mechanism can be simplified.

(B) In the liquid ejection apparatus according to (A) above, cleaning that discharges the liquid from the nozzle by pressurizing the liquid storage chamber may be performed. In this structure, the structure of the pressurizing mechanism having the liquid storage chamber that stores a liquid for cleaning the nozzles by pressurizing the interior of the ejection head can be simplified.

(C) In the liquid ejection apparatus according to (A) or (B) above, the deforming member may be a diaphragm. In this structure, since pressing of the diaphragm can pressurize the interior of the ejection head, the structure of the pressurizing mechanism having the liquid storage chamber can be simplified.

(D) In the liquid ejection apparatus according to (C) above, the pressurizing mechanism may include a biasing member that biases the diaphragm in a direction in which the volume of the liquid storage chamber increases, and, when the carriage moves away from the diaphragm, the liquid storage chamber may be filled with the liquid from the liquid storage portion. In this structure, the structure of the pressurizing mechanism that stores the liquid in the liquid storage chamber after pressurization can be simplified.

(E) In the liquid ejection apparatus according to any one of (A) to (D) above, the ejection head may be a line head. In this structure, even when the ejection head is a line head, the structure of the pressurizing mechanism and the structure of the drive system that drives the pressurizing mechanism can be simplified. For example, when the ejection head is a serial head, the structure in which the head carriage that moves the ejection head presses the deforming member of the pressurizing mechanism can be adopted. However, even a line head not having this type of the head carriage can press the deforming member of the pressurizing mechanism by using the carriage of the maintenance portion.

(F) In the liquid ejection apparatus according to any one of (A) to (E) above, the maintenance portion may be a wiper that wipes a nozzle surface of the ejection head in which the nozzle is open, and the carriage may be a wiper carriage having the wiper.

In this structure, the ejection head can be pressurized by the wiper carriage pressuring the deforming member of the pressurizing mechanism. A dedicated carriage that presses the deforming member of the pressurizing mechanism is not necessary. Accordingly, the structure of the drive system that drives the pressurizing mechanism can be simplified. Ultimately, the structure of the liquid ejection apparatus can be simplified.

(G) In the liquid ejection apparatus according to any one of (A) to (E) above, the maintenance portion may be a cap that receives the liquid discharged from the nozzle of the ejection head, and the carriage may be a cap carriage having the cap. In this structure, the ejection head can be pressurized by the cap carriage pressuring the deforming member of the pressurizing mechanism. A dedicated carriage that presses the deforming member of the pressurizing mechanism is not necessary. Accordingly, the structure of the drive system that drives the pressurizing mechanism can be simplified. Ultimately, the structure of the liquid ejection apparatus can be simplified.

(H) The liquid ejection apparatus according to any one of (A) to (G) above may further include a first on-off valve disposed in the liquid supply path, the first on-off valve being located upstream of the pressurizing mechanism in a liquid supply direction in which the liquid is supplied from the liquid storage portion to the ejection head; a second on-off valve disposed in the liquid supply path, the second on-off valve being located downstream of the pressurizing mechanism in the liquid supply direction; and a control portion that controls the carriage, the first on-off valve, and the second on-off valve, in which the control portion may pressurize the liquid storage chamber by moving the carriage to the pressurized position with the first on-off valve closed and the second on-off valve open.

In this structure, the liquid pushed out from the liquid storage chamber by the carriage pressing the deforming member at the pressurized position can be effectively used to pressurize the interior of the ejection head. For example, the volume of the liquid storage chamber can be suppressed small. In this case, the structure contributes to the downsizing of the pressurizing mechanism.

(I) In the liquid ejection apparatus according to (H) above, the control portion may close the second on-off valve with the carriage located at the pressurized position after pressurizing the liquid storage chamber. In this structure, even when pressing of the deforming member is released after the second on-off valve is closed, pressurization of the interior of the ejection head can be maintained. This can keep extension of the liquid from the openings of the nozzles. For example, bubbles can be suppressed from entering the nozzles when the wiper wipes the ejection head.

(J) In the liquid ejection apparatus according to (H) or (I) above, the control portion may open the first on-off valve before the carriage moves away from the pressurized position. In this structure, after the ejection head is pressurized, the liquid can be quickly stored in the liquid storage chamber. For example, the waiting time until the liquid storage chamber is filled with a predetermined amount of liquid can be reduced.

(K) In the liquid ejection apparatus according to (F) above, the wiper carriage may pressurize the liquid in the nozzle by pressurizing the liquid storage chamber at the pressurized position, and the wiper may wipe the nozzle surface of the ejection head with the liquid storage chamber pressurized. In this structure, the ejection head can be wiped in a state in which the interior of the ejection head is pressurized and the liquid is extended from the nozzles. Bubbles can be suppressed from entering the nozzles during wiping.

What is claimed is:

1. A liquid ejection apparatus comprising:

a carriage having a maintenance portion that maintains an ejection head ejecting a liquid from a nozzle; and a pressurizing mechanism disposed in a liquid supply path via which a liquid from a liquid storage portion is supplied to the ejection head, wherein the pressurizing mechanism includes a liquid storage chamber that forms a portion of the liquid supply path and a deforming member configured to deform to change a volume of the liquid storage chamber, the carriage is configured to press the deforming member at a pressurized position on a movement route, and the carriage causes a liquid in the nozzle of the ejection head communicating with the liquid storage chamber to flow in a discharge direction by pressing the deforming member at the pressurized position to pressurize the liquid storage chamber.

2. The liquid ejection apparatus according to claim 1, wherein cleaning that discharges the liquid from the nozzle by pressurizing the liquid storage chamber is performed.

3. The liquid ejection apparatus according to claim 1, wherein the deforming member is a diaphragm.

4. The liquid ejection apparatus according to claim 3, wherein the pressurizing mechanism includes a biasing member that biases the diaphragm in a direction in which the volume of the liquid storage chamber increases, and when the carriage moves away from the diaphragm, the liquid storage chamber is filled with the liquid from the liquid storage portion.

5. The liquid ejection apparatus according to claim 1, wherein the ejection head is a line head.

6. The liquid ejection apparatus according to claim 1, wherein the maintenance portion is a wiper that wipes a nozzle surface of the ejection head in which the nozzle is open, and the carriage is a wiper carriage having the wiper.

7. The liquid ejection apparatus according to claim 6, wherein the wiper carriage pressurizes the liquid in the nozzle by pressurizing the liquid storage chamber at the pressurized position, and the wiper wipes the nozzle surface of the ejection head with the liquid storage chamber pressurized.

8. The liquid ejection apparatus according to claim 1, wherein the maintenance portion is a cap that receives the liquid discharged from the nozzle of the ejection head, and the carriage is a cap carriage having the cap.

9. The liquid ejection apparatus according to claim 1, further comprising:

a first on-off valve disposed in the liquid supply path, the first on-off valve being located upstream of the pressurizing mechanism in a liquid supply direction in which the liquid is supplied from the liquid storage portion to the ejection head;

a second on-off valve disposed in the liquid supply path, the second on-off valve being located downstream of the pressurizing mechanism in the liquid supply direction; and a control portion that controls the carriage, the first on-off valve, and the second on-off valve, wherein the control portion pressurizes the liquid storage chamber by moving the carriage to the pressurized position with the first on-off valve closed and the second on-off valve open.

10. The liquid ejection apparatus according to claim 9, wherein the control portion closes the second on-off valve with the carriage located at the pressurized position after pressurizing the liquid storage chamber.

11. The liquid ejection apparatus according to claim 10, wherein the control portion opens the first on-off valve before the carriage moves away from the pressurized position.

* * * * *